US010072100B2

(12) United States Patent
Nambiar et al.

(10) Patent No.: US 10,072,100 B2
(45) Date of Patent: *Sep. 11, 2018

(54) OXIDIZED POLY ALPHA-1,3-GLUCAN

(71) Applicant: E I DU PONT DE NEMOURS AND COMPANY, Wilmington, DE (US)

(72) Inventors: Rakesh Nambiar, West Chester, PA (US); Jayme L Paullin, Claymont, DE (US); Andrea M Perticone, Clayton, DE (US); T Joseph Dennes, Parkesburg, PA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/611,081

(22) Filed: Jun. 1, 2017

(65) Prior Publication Data
US 2017/0267787 A1 Sep. 21, 2017

Related U.S. Application Data

(63) Continuation of application No. 14/641,567, filed on Mar. 9, 2015, now Pat. No. 9,695,253.

(60) Provisional application No. 61/950,878, filed on Mar. 11, 2014.

(51) Int. Cl.
C08B 37/00 (2006.01)
C11D 3/22 (2006.01)
C11D 3/00 (2006.01)
C11D 3/28 (2006.01)

(52) U.S. Cl.
CPC ........ C08B 37/0009 (2013.01); C11D 3/0036 (2013.01); C11D 3/223 (2013.01); C11D 3/28 (2013.01)

(58) Field of Classification Search
None
See application file for complete search history.

(56) References Cited

U.S. PATENT DOCUMENTS

| | | | |
|---|---|---|---|
| 2,894,945 A | 7/1959 | Hofreiter et al. | |
| 3,086,969 A | 4/1963 | Slager et al. | |
| 4,580,421 A | 4/1986 | Babuin et al. | |
| 4,794,661 A | 1/1989 | Durazzani | |
| 4,985,553 A | 1/1991 | Fuertes et al. | |
| 5,747,658 A | 5/1998 | Veelaert et al. | |
| 5,945,394 A | 8/1999 | Sajic et al. | |
| 6,498,269 B1 * | 12/2002 | Merbouh | C07C 59/285 536/18.2 |
| 6,635,755 B1 * | 10/2003 | Jaschinski | C08B 15/02 536/18.7 |
| 6,800,753 B2 | 10/2004 | Kumar | |
| 6,831,173 B1 * | 12/2004 | Jetten | C12P 19/04 435/101 |
| 7,000,000 B1 * | 2/2006 | O'Brien | C12P 19/08 536/123.12 |
| 7,012,053 B1 * | 3/2006 | Barnabas | C11D 3/221 510/101 |
| 7,595,392 B2 | 9/2009 | Kumar et al. | |
| 8,541,041 B2 | 9/2013 | Pilling | |
| 2005/0059124 A1 * | 3/2005 | Rieping | C12P 13/08 435/106 |
| 2005/0059633 A1 * | 3/2005 | Van Geel-Schuten | C12N 9/1051 514/54 |
| 2011/0236935 A1 * | 9/2011 | Mikkelsen | C12N 9/0006 435/100 |
| 2013/0244287 A1 | 9/2013 | O'Brien et al. | |
| 2013/0244288 A1 | 9/2013 | O'Brien et al. | |
| 2014/0087431 A1 | 3/2014 | Payne et al. | |
| 2015/0259439 A1 * | 9/2015 | Nambiar | C08B 37/0009 510/299 |

FOREIGN PATENT DOCUMENTS

| | | | |
|---|---|---|---|
| CA | 2028284 A1 | 4/1991 | |
| CA | 2038640 A1 | 9/1991 | |
| CN | 1283633 A | 2/2001 | |
| EP | 0472042 A1 * | 2/1992 | ............. C08B 31/18 |
| EP | 2261262 A1 * | 12/2010 | ............. C08B 15/02 |
| EP | 2700657 A1 * | 2/2014 | ......... C08B 37/0009 |
| FR | 2854161 | 10/2004 | |
| FR | 2854161 A1 * | 10/2004 | ............. C08B 15/00 |
| WO | WO 0065015 A2 * | 11/2000 | ............... C11D 1/62 |
| WO | 200232913 A1 | 4/2002 | |
| WO | WO 0232913 A1 * | 4/2002 | ........... C07C 59/285 |
| WO | 2003008613 A2 | 1/2003 | |
| WO | 2008035975 A2 | 3/2008 | |
| WO | WO 2008035975 A2 * | 3/2008 | ............. C08B 11/20 |
| WO | 2013052730 | 4/2013 | |

OTHER PUBLICATIONS

Corresponding PCT Application PCT/US2015/019372 dated May 15, 2015.
Bao et al., Chemical Modification of the (1-->3)-α-D-Glucan From Spores of Ganoderma Lucidum and Investigation of Their Physicochemical Properties and Immunological Activity, Carbohydrate Research, vol. 336 (2001), pp. 127-140.
Fukuzumi et al., Thermal Stabilization of Tempo-Oxidized Cellulose, Polymer Degradation and Stability, vol. 95 (2010), pp. 1502-1508.
Jeanes et al., Characterization and Classification of Dextrans From Nintey-Six Strains of Bacteria, Contribution From the Starch and Dextrose Section, Northern Utilization Research Branch, Oct. 20, 1954, pp. 5041-5052.
Kiho et al., (1-->3)-α-D-Glucan From an Alalike Extract of Agrocybe Cylindracea and Antitumor Activity of Its O-(Carboxy-Methyl)ated Derivatives, Carbohydrate Research, vol. 189 (1989), pp. 273-279.

(Continued)

Primary Examiner — Nicole M Buie-Hatcher
Assistant Examiner — M. Reza Asdjodi

(57) ABSTRACT

Compositions comprising oxidized poly alpha-1,3-glucan compounds are disclosed herein. Oxidized poly alpha-1,3-glucan compounds are produced by contacting poly alpha-1,3-glucan under aqueous conditions with at least one N-oxoammonium salt.

30 Claims, No Drawings

(56) References Cited

OTHER PUBLICATIONS

Ogawa et al., Crystal Structure of (1-->3)-α-D-Glucan, in Fiber Diffraction Methods, French, A. et al., ACS Symposium Series; American Chemical Society, Washington, D.C. 1980, pp. 333-362.
Ogawa et al., X-Ray Diffraction Data for (1-->3)-α-D-Glucan Triacetate, Carbohydrate Polymers, vol. 3 (1983), pp. 287-297.
Rutherford et al., Oxidation of Cellulose: The Reaction of Cellulose With Periodic Acid, Research Paper RP1491, US Department of Commerce, National Bureau of Standards, pp. 131-141.
Shida et al., (1-->3)-α-D-Glucan Isolated From the Fruit Bodies of Lentinus Edodes, Carbohydrate Research, vol. 60 (1978), pp. 117-127.
Simpson et al., Four Glucosyltransferases, GTFJ, GTFK, GTFL and GTFM, From *Streptococcus salivarius* ATCC 25975, Microbiology, vol. 141 (1995), pp. 1451-1460.
Tamura et al., Oxidation of Curdlan and Other Polysaccharides by 4-Acetamide-Tempo/NAC10/NAC102 Under Acid Conditions, Carbohydrate Polymers, vol. 81 (2010), pp. 592-598.
Tojo et al., Oxidation of Primary Alcohols to Carboxylic Acids, A Guide to Current Commont Practice, Hardcover (2007), Chapter 6, Tempo-Mediated Oxidations, pp. 79-103.
Yui et al., Molecular and Crystal Structure of (1-->3)-α-D-Glucan Triacetate, Int. J. Biol. Macromol., vol. 14 (1992), pp. 87-96.
James et al., 4-Methylmorpholine N-Oxide-Methyl Sulfoxide Soluble Glucan of Piptoporus Betulinus, Carbohydrate Research, vol. 206 (1990), pp. 167-172.

\* cited by examiner

OXIDIZED POLY ALPHA-1,3-GLUCAN

This application is a continuation of application Ser. No. 14/641,567, filed Mar. 9, 2015 (now U.S. Pat. No. 9,695,253), which claims the benefit of U.S. Provisional Application No. 61/950,878, filed Mar. 11, 2014. Both of these prior applications are incorporated herein by reference in their entirety.

FIELD OF INVENTION

This invention is in the field of poly alpha-1,3-glucan derivatives. Specifically, this invention pertains to oxidized poly alpha-1,3-glucan and methods of preparation thereof.

BACKGROUND

Driven by a desire to find new structural polysaccharides using enzymatic syntheses or genetic engineering of microorganisms or plant hosts, researchers have discovered polysaccharides that are biodegradable, and that can be made economically from renewable resource-based feedstocks. One such polysaccharide is poly alpha-1,3-glucan, a glucan polymer characterized by having alpha-1,3-glycosidic linkages. This polymer has been isolated by contacting an aqueous solution of sucrose with a glucosyltransferase enzyme isolated from *Streptococcus salivarius* (Simpson et al., *Microbiology* 141:1451-1460, 1995). Films prepared from poly alpha-1,3-glucan tolerate temperatures up to 150° C. and provide an advantage over polymers obtained from beta-1,4-linked polysaccharides (Ogawa et al., *Fiber Differentiation Methods* 47:353-362, 1980).

U.S. Pat. No. 7,000,000 disclosed the preparation of a polysaccharide fiber comprising hexose units, wherein at least 50% of the hexose units within the polymer were linked via alpha-1,3-glycosidic linkages using an *S. salivarius* gtfJ enzyme. This enzyme utilizes sucrose as a substrate in a polymerization reaction producing poly alpha-1,3-glucan and fructose as end-products (Simpson et al., 1995). The disclosed polymer formed a liquid crystalline solution when it was dissolved above a critical concentration in a solvent or in a mixture comprising a solvent. From this solution continuous, strong, cotton-like fibers, highly suitable for use in textiles, were spun and used.

Kiho et al. (Carb. Res. 189:273-270, 1989) and Zhang et al. (Intl. Publ. No. CN1283633) disclosed producing the ether-derivatized poly alpha-1,3-glucan, carboxymethylglucan. Yui et al. (*Int. J. Biol. Macromol.* 14:87-96, 1992) and Ogawa et al. (*Carb. Poly.* 3:287-297, 1983) disclosed esterifying poly alpha-1,3-glucan to produce poly alpha-1,3-glucan triacetate.

Development of new poly alpha-1,3-glucan derivatives (e.g., oxidized poly alpha-1,3-glucan) and methods of preparing such derivatives is desirable given their potential utility in various applications.

SUMMARY OF INVENTION

In one embodiment, the invention concerns a composition comprising an oxidized poly alpha-1,3-glucan compound produced by contacting poly alpha-1,3-glucan under aqueous conditions with at least one N-oxoammonium salt.

In another embodiment, the poly alpha-1,3-glucan contacted with at least one N-oxoammonium salt has at least 90% alpha-1,3 glycosidic linkages. The poly alpha-1,3-glucan in another embodiment has a weight-average molecular weight of at least 1000.

In another embodiment, the N-oxoammonium salt comprises a TEMPO oxoammonium salt. The N-oxoammonium salt can comprise a 4-acetamido-TEMPO oxoammonium salt in another embodiment.

In another embodiment, the aqueous conditions are acidic.

In another embodiment, the composition is a household product, personal care product, industrial product, pharmaceutical product, or food product. The composition is a detergent composition in another embodiment. A detergent composition is preferably a household product, for example.

In another embodiment, the invention concerns a method for producing an oxidized poly alpha-1,3-glucan compound. This method comprises: contacting poly alpha-1,3-glucan under aqueous conditions with at least one N-oxoammonium salt, wherein the poly alpha-1,3-glucan is oxidized by the N-oxoammonium salt thereby producing an oxidized poly alpha-1,3-glucan compound. The oxidized poly alpha-1,3-glucan compound produced by this method can optionally be isolated.

In another embodiment, the poly alpha-1,3-glucan contacted with at least one N-oxoammonium salt has at least 90% alpha-1,3 glycosidic linkages. The poly alpha-1,3-glucan in another embodiment has a weight-average molecular weight of at least 1000.

In another embodiment, the N-oxoammonium salt comprises a TEMPO oxoammonium salt. The N-oxoammonium salt can comprise a 4-acetamido-TEMPO oxoammonium salt in another embodiment of the method.

In another embodiment, the TEMPO oxoammonium salt is provided in the method by oxidizing an agent comprising TEMPO under the aqueous conditions. The agent comprising TEMPO is 4-acetamido-TEMPO in another embodiment.

In another twelfth embodiment, the aqueous conditions of the method are acidic.

In another embodiment, the invention concerns a method of preparing an aqueous composition having increased builder and/or anti-redeposition capacity. This method comprises: contacting an oxidized poly alpha-1,3-glucan compound produced according to the present disclosure with an aqueous composition, wherein the builder and/or anti-redeposition capacity of the aqueous composition is increased by the oxidized poly alpha-1,3-glucan compound compared to the builder and/or anti-redeposition capacity of the aqueous composition as it existed before the contacting step.

In another embodiment, the invention concerns a method of treating a material. This method comprises: contacting a material with an aqueous composition comprising an oxidized poly alpha-1,3-glucan compound produced according to the present disclosure.

DETAILED DESCRIPTION OF INVENTION

The disclosures of all patent and non-patent literature cited herein are incorporated herein by reference in their entirety.

As used herein, the term "invention" or "disclosed invention" is not meant to be limiting, but applies generally to any of the inventions defined in the claims or described herein. These terms are used interchangeably herein.

The terms "poly alpha-1,3-glucan", "alpha-1,3-glucan polymer" and "glucan polymer" are used interchangeably herein. Poly alpha-1,3-glucan is a polymer comprising glucose monomeric units linked together by glycosidic linkages, wherein at least about 50% of the glycosidic linkages are alpha-1,3-glycosidic linkages. Poly alpha-1,3-glucan is a type of polysaccharide. The structure of poly alpha-1,3-glucan can be illustrated as follows:

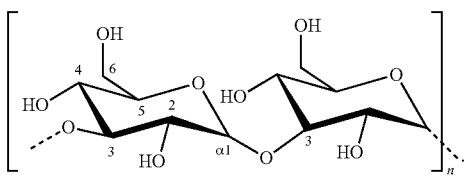

This structure indicates that poly alpha-1,3-glucan has hydroxyl groups at carbons 2, 4 and 6 of each monomeric unit. Carbons 2 and 4 represent secondary alcohol groups ($R_1R_2CH$—OH), while carbon 6 represents a primary alcohol group (R—$CH_2$—OH).

The poly alpha-1,3-glucan that can be used for preparing oxidized poly alpha-1,3-glucan compounds herein can be prepared using chemical methods. Alternatively, it can be prepared by extracting it from various organisms, such as fungi, that produce poly alpha-1,3-glucan. Alternatively still, poly alpha-1,3-glucan can be enzymatically produced from sucrose using one or more glucosyltransferase (gtf) enzymes (e.g., gtfJ), such as described in U.S. Pat. No. 7,000,000, and U.S. Patent Appl. Publ. Nos. 2013/0244288, 2013/0244287 and 2014/0087431 (all of which are incorporated herein by reference), for example.

The terms "glucosyltransferase enzyme", "gtf enzyme", "gtf enzyme catalyst", "gtf", "glucansucrase" and the like are used interchangeably herein. The activity of a gtf enzyme herein catalyzes the reaction of the substrate sucrose to make the products poly alpha-1,3-glucan and fructose. Other products (byproducts) of a gtf reaction can include glucose (where glucose is hydrolyzed from the glucosyl-gtf enzyme intermediate complex), various soluble oligosaccharides (DP2-DP7), and leucrose (where glucose of the glucosyl-gtf enzyme intermediate complex is linked to fructose). Leucrose is a disaccharide composed of glucose and fructose linked by an alpha-1,5 linkage. Wild type forms of glucosyltransferase enzymes generally contain (in the N-terminal to C-terminal direction) a signal peptide, a variable domain, a catalytic domain, and a glucan-binding domain. A gtf herein is classified under the glycoside hydrolase family 70 (GH70) according to the CAZy (Carbohydrate-Active EnZymes) database (Cantarel et al., Nucleic Acids Res. 37:D233-238, 2009).

The percentage of glycosidic linkages between the glucose monomer units of poly alpha-1,3-glucan used to prepare oxidized poly alpha-1,3-glucan compounds herein that are alpha-1,3 is at least about 50%, 60%, 70%, 80%, 90%, 95%, 96%, 97%, 98%, 99%, or 100% (or any integer value between 50% and 100%). In such embodiments, accordingly, poly alpha-1,3-glucan has less than about 50%, 40%, 30%, 20%, 10%, 5%, 4%, 3%, 2%, 1%, or 0% (or any integer value between 0% and 50%) of glycosidic linkages that are not alpha-1,3.

Poly alpha-1,3-glucan used to produce oxidized poly alpha-1,3-glucan compounds herein is preferably linear/unbranched. In certain embodiments, poly alpha-1,3-glucan has no branch points or less than about 10%, 9%, 8%, 7%, 6%, 5%, 4%, 3%, 2%, or 1% branch points as a percent of the glycosidic linkages in the polymer. Examples of branch points include alpha-1,6 branch points, such as those present in mutan polymer.

The terms "glycosidic linkage" and "glycosidic bond" are used interchangeably herein and refer to the type of covalent bond that joins a carbohydrate (sugar) molecule to another group such as another carbohydrate. The term "alpha-1,3-glycosidic linkage" as used herein refers to the type of covalent bond that joins alpha-D-glucose molecules to each other through carbons 1 and 3 on adjacent alpha-D-glucose rings. This linkage is illustrated in the poly alpha-1,3-glucan structure provided above. Herein, "alpha-D-glucose" will be referred to as "glucose".

The terms "oxidized poly alpha-1,3-glucan compound", "oxidized poly alpha-1,3-glucan derivative", "oxidized poly alpha-1,3-glucan" and the like are used interchangeably herein. An oxidized poly alpha-1,3-glucan compound herein is a compound resulting from oxidation of one or more of the hydroxyl groups at positions 2, 4 and/or 6 of poly alpha-1,3-glucan. This oxidation may independently convert each of these hydroxyl groups to an aldehyde, ketone, or carboxylic group. Poly alpha-1,3-glucan can be oxidized herein by contacting it with an N-oxoammonium salt under aqueous conditions, for example. It is believed that oxidized poly alpha-1,3-glucan as disclosed herein can also be prepared via application of other oxidation processes, if desired, such as processes disclosed in Canadian Patent Publ. Nos. 2028284 and 2038640, and U.S. Pat. Nos. 4,985,553, 2,894,945, 5,747,658 and 7,595,392, all of which are incorporated herein by reference.

The term "oxidized" as used herein characterizes a compound, or atom within a compound, from which electrons have been removed. With regard to oxidation of poly alpha-1,3-glucan, since the position 6 carbon of a monomeric unit of poly alpha-1,3-glucan represents a primary alcohol (R—$CH_2$—OH), this carbon can be oxidized to an aldehyde (R—CHO) or carboxylic acid (R—COOH). The carbons at positions 2 and 4 of a monomeric unit of poly alpha-1,3-glucan represent secondary alcohols ($R_1R_2CH$—OH) that can each independently be oxidized to a ketone ($R_1R_2CH$=OH). Alternatively, carbons 2 and 4 of poly alpha-1,3-glucan can each independently be oxidized to aldehyde or carboxylic acid groups, in which case the monomeric ring unit of poly alpha-1,3-glucan is opened (i.e., no longer cyclic).

Oxidized poly alpha-1,3-glucan compounds disclosed herein are synthetic, man-made compounds.

The terms "N-oxoammonium salt" and "oxoammonium salt" are used interchangeably herein. An N-oxoammonium salt herein refers to the following structure:

(structure I)

where $R^1$ and $R^2$ each represent the same or different organic groups (e.g., a linear or branched carbon chain), and $X^-$ is a counterion. Alternatively, $R^1$ and $R^2$ can each be part of the same group bound to the $N^+$, in which case $N^+$ is part of a ring structure. An example herein of an N-oxoammonium salt having a ring structure (i.e., a "cyclic N-oxoammonium salt") is a TEMPO oxoammonium salt.

An "agent for oxidizing poly alpha-1,3-glucan" herein can comprise an N-oxoammonium salt.

The term "TEMPO oxoammonium salt" herein refers to the following structure:

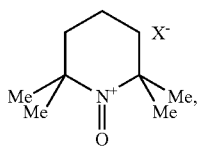
(structure II)

where each Me represents a methyl group and X⁻ is a counterion. An example of an N-oxoammonium salt comprising TEMPO oxoammonium salt is 4-acetamido-TEMPO oxoammonium salt.

The terms "4-acetamido-TEMPO oxoammonium salt" and "4-acimido-TEMPO oxoammonium salt" are used interchangeably herein. 4-acetamido-TEMPO oxoammonium salt herein refers to the following structure:

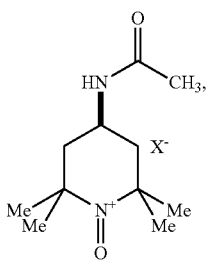
(structure III)

where each Me represents a methyl group and X⁻ is a counterion.

An "agent comprising TEMPO" herein refers to an agent/compound comprising 2,2,6,6-tetramethylpiperidine 1-oxyl (TEMPO). TEMPO has the following structure:

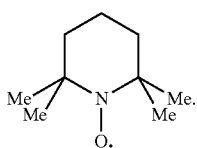
(structure IV)

Examples of agents comprising TEMPO are TEMPO itself and 4-acetamido-TEMPO. "4-acetamido-TEMPO" (alternatively referred to as "4-acimido-TEMPO") has the following structure:

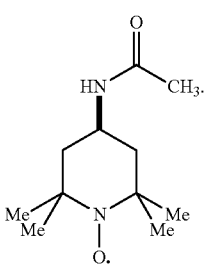
(structure V)

An agent comprising TEMPO can be oxidized to its corresponding N-oxoammonium salt. For example, TEMPO can be oxidized to TEMPO oxoammonium salt, and 4-acetamido-TEMPO can be oxidized to 4-acetamido-TEMPO oxoammonium salt. Thus, a "precursor of an N-oxoammonium salt" such as TEMPO or 4-acetamido-TEMPO, can be used to provide an N-oxoammonium salt in an oxidation reaction as disclosed herein.

The terms "reaction", "reaction preparation", "reaction composition", "oxidation reaction" and the like are used interchangeably herein and refer to a reaction under aqueous conditions comprising at least poly alpha-1,3-glucan and an N-oxoammonium salt. A reaction preparation can be either a mixture or solution, generally depending on the degree to which poly alpha-1,3-glucan is dissolved while preparing a reaction. For example, a reaction can begin as a slurry, and become a solution as poly alpha-1,3-glucan becomes oxidized. A reaction is conducted under suitable conditions (e.g., time, temperature, pH) for the N-oxoammonium salt to oxidize one or more hydroxyl groups of the glucose monomeric units of poly alpha-1,3-glucan, thereby yielding an oxidized poly alpha-1,3-glucan compound.

The terms "aqueous conditions", "aqueous reaction conditions", "aqueous setting", "aqueous system" and the like are used interchangeably herein. Aqueous conditions herein refer to a solution or mixture in which the solvent is at least about 60 wt % water, for example. An oxidation reaction herein can be performed under aqueous conditions. Aqueous conditions can be acidic.

The terms "acidic", "acidic conditions", "acidic aqueous conditions" and the like are used interchangeably herein. Acidic conditions herein can refer to a solution or mixture pH of 5.5 or less, for example. Acidic conditions can be prepared by any means known in the art, such as by adding acetic acid and/or an acetate salt to a solution or mixture.

The term "poly alpha-1,3-glucan slurry" herein refers to an aqueous mixture comprising the components of a glucosyltransferase enzymatic reaction such as poly alpha-1,3-glucan, sucrose, one or more glucosyltransferase enzymes, glucose and fructose.

The term "poly alpha-1,3-glucan wet cake" herein refers to poly alpha-1,3-glucan that has been separated from a slurry and washed with water or an aqueous solution. Poly alpha-1,3-glucan is not dried when preparing a wet cake.

The "molecular weight" of poly alpha-1,3-glucan and oxidized poly alpha-1,3-glucan compounds herein can be represented as number-average molecular weight ($M_n$) or as weight-average molecular weight ($M_w$). Alternatively, molecular weight can be represented as Daltons, grams/mole, DPw (weight average degree of polymerization), or DPn (number average degree of polymerization). Various means are known in the art for calculating these molecular weight measurements, such as high-pressure liquid chromatography (HPLC), size exclusion chromatography (SEC), or gel permeation chromatography (GPC).

The term "crosslink" herein refers to a chemical bond, atom, or group of atoms that connects two adjacent atoms in one or more molecules. It should be understood that, in a composition comprising crosslinked oxidized poly alpha-1,3-glucan, crosslinks can be between at least two oxidized poly alpha-1,3-glucan molecules (i.e., intermolecular crosslinks); there can also be intramolecular crosslinking. A "crosslinking agent" as used herein is an atom or compound that can create crosslinks.

An "aqueous composition" herein has a liquid component that comprises at least about 10 wt % water, for example. Examples of aqueous compositions include mixtures, solutions, dispersions (e.g., colloidal dispersions), suspensions and emulsions, for example. Aqueous compositions in certain embodiments comprise oxidized poly alpha-1,3-glucan that is (i) dissolved in the aqueous composition (i.e., in solution), or (ii) not dissolved in the aqueous composition (e.g., present as a colloidal dispersion).

As used herein, the term "colloidal dispersion" refers to a heterogeneous system having a dispersed phase and a dispersion medium, i.e., microscopically dispersed insoluble particles (e.g., some forms of oxidized poly alpha-1,3-glucan herein) are suspended throughout another substance (e.g., an aqueous composition such as water or aqueous solution). An example of a colloidal dispersion herein is a hydrocolloid. All, or a portion of, the particles of a colloidal dispersion such as a hydrocolloid can comprise certain oxidized poly alpha-1,3-glucan compounds of the present disclosure. The terms "dispersant" and "dispersion agent" are used interchangeably herein to refer to a material that promotes the formation and/or stabilization of a dispersion.

The terms "hydrocolloid" and "hydrogel" are used interchangeably herein. A hydrocolloid refers to a colloid system in which water or an aqueous solution is the dispersion medium.

The term "aqueous solution" herein refers to a solution in which the solvent comprises water. An aqueous solution can serve as a dispersant in certain aspects herein. Oxidized poly alpha-1,3-glucan compounds in certain embodiments can be dissolved, dispersed, or mixed within an aqueous solution.

The term "viscosity" as used herein refers to the measure of the extent to which a fluid or an aqueous composition resists a force tending to cause it to flow. Various units of viscosity that can be used herein include centipoise (cPs) and Pascal-second (Pa·S). One poise is equal to 0.100 kg·m$^{-1}$·s$^{-1}$, or 1 mPa·s. Thus, the terms "viscosity modifier" and "viscosity-modifying agent" as used herein refer to anything that can alter/modify the viscosity of a fluid or aqueous composition.

The term "shear thinning behavior" as used herein refers to a decrease in the viscosity of an aqueous composition as shear rate increases. The term "shear thickening behavior" as used herein refers to an increase in the viscosity of an aqueous composition as shear rate increases. "Shear rate" herein refers to the rate at which a progressive shearing deformation is applied to an aqueous composition. A shearing deformation can be applied rotationally, for example.

The term "contacting" as used herein with respect to methods of increasing the builder capacity and/or anti-redeposition capacity of an aqueous composition refers to any action that results in bringing together an aqueous composition with at least one oxidized poly alpha-1,3-glucan compound as presently disclosed. Contacting can be performed by any means known in the art, such as mixing, shaking, or homogenization, for example.

The terms "fabric", "textile", "cloth" and the like are used interchangeably herein to refer to a woven material having a network of natural and/or artificial fibers. Such fibers can be in the form of thread or yarn, for example.

A "fabric care composition" herein is any composition suitable for treating fabric in some manner. Examples of such a composition include laundry detergents and fabric softeners.

The terms "heavy duty detergent", "all-purpose detergent" and the like are used interchangeably herein to refer to a detergent useful for regular washing of white and colored textiles at any temperature. The terms "low duty detergent", "fine fabric detergent" and the like are used interchangeably herein to refer to a detergent useful for the care of delicate fabrics such as viscose, wool, silk, microfiber or other fabric requiring special care. "Special care" can include conditions of using excess water, low agitation, and/or no bleach, for example.

A "detergent composition" herein typically comprises at least a surfactant (detergent compound) and/or a builder. A "surfactant" herein refers to a substance that tends to reduce the surface tension of a liquid in which the substance is dissolved. A surfactant may act as a detergent, wetting agent, emulsifier, foaming agent, and/or dispersant, for example.

The terms "builder", "builder agent" and the like herein refer to compositions such as oxidized poly alpha-1,3-glucan that, for example, can complex with hard water cations such as calcium and magnesium cations. Such complex formation is believed to prevent the formation of water-insoluble salt(s) by the cation(s). While not intending to be held to any particular theory, it is believed that oxidized poly alpha-1,3-glucan herein orchestrates builder activity through cation sequestration (chelation) or cation exchange. In the context of a detergent composition for cleaning applications, a builder added thereto typically can enhance or maintain the cleaning efficiency of a surfactant present in the detergent composition. The terms "builder capacity", "builder activity" and the like are used interchangeably herein and refer to the ability of an aqueous composition to exhibit features endowed by one or more builders (e.g., oxidized poly alpha-1,3-glucan) present in the aqueous composition.

The terms "anti-redeposition agent", "anti-soil redeposition agent", "anti-greying agent" and the like herein refer to agents that help keep soils from redepositing onto clothing in laundry wash water after these soils have been removed, therefore preventing greying/discoloration of laundry. Anti-redeposition agents can function by helping keep soil dispersed in wash water and/or by blocking attachment of soil onto fabric surfaces.

An "oral care composition" herein is any composition suitable for treating an soft or hard surface in the oral cavity such as dental (teeth) and/or gum surfaces.

The term "adsorption" herein refers to the adhesion of a compound (e.g., oxidized poly alpha-1,3-glucan herein) to the surface of a material.

The terms "percent by volume", "volume percent", "vol %", "v/v %" and the like are used interchangeably herein. The percent by volume of a solute in a solution can be determined using the formula: [(volume of solute)/(volume of solution)]×100%.

The terms "percent by weight", "weight percentage (wt %)", "weight-weight percentage (% w/w)" and the like are used interchangeably herein. Percent by weight refers to the percentage of a material on a mass basis as it is comprised in a composition, mixture or solution.

The term "increased" as used herein can refer to a quantity or activity that is at least about 1%, 2%, 3%, 4%, 5%, 6%, 7%, 8%, 9%, 10%, 11%, 12%, 13%, 14%, 15%, 16%, 17%, 18%, 19%, 20%, 50%, 100%, or 200% more than the quantity or activity for which the increased quantity or activity is being compared. The terms "increased", "elevated", "enhanced", "greater than", "improved" and the like are used interchangeably herein.

The term "isolated" as used herein refers to material (e.g., oxidized poly alpha-1,3-glucan) that has been completely or partially purified. Oxidized poly alpha-1,3-glucan compounds of the present disclosure are synthetic, man-made compounds. Such compounds are believed to not occur in nature.

Embodiments of the disclosed invention concern a composition comprising an oxidized poly alpha-1,3-glucan compound produced by contacting poly alpha-1,3-glucan under aqueous conditions with at least one N-oxoammonium salt. Thus, oxidized poly alpha-1,3-glucan is disclosed.

It is believed that an oxidized poly alpha-1,3-glucan compound herein is a compound resulting from oxidation of one or more of the hydroxyl groups at carbon positions 2, 4 and/or 6 of poly alpha-1,3-glucan. The following carbon position(s) of a monomeric unit of poly alpha-1,3-glucan may be oxidized in certain non-limiting examples: (i) only carbon 2; (ii) only carbon 4; (iii) only carbon 6; (iv) all carbons 2, 4 and 6; (v) both carbons 2 and 4; (vi) both carbons 2 and 6; and (vii) both carbons 4 and 6. Such oxidation (e.g., any of oxidation examples i-vii) may occur in all, or in at least 60%, 65%, 70%, 75%, 80%, 85%, 90%, 95%, 96%, 97%, 98%, or 99% (or any integer between 60% and 100%), of the constituent monomeric units of the poly alpha-1,3-glucan.

It is believed that oxidation occurring at carbon position 6 of poly alpha-1,3-glucan herein converts the hydroxyl group to an aldehyde or carboxylic group. Typically, enhanced oxidation conditions (e.g., increased oxidation reaction time and/or amount of N-oxoammonium salt) may lead to conversion of the position 6 carbon to a carboxylic group, whereas weaker oxidation conditions may lead to conversion of the position 6 carbon to an aldehyde group.

It is believed that oxidation occurring at carbon positions 2 and/or 4 of poly alpha-1,3-glucan herein convert the hydroxyl group at either or both of these positions to a ketone, aldehyde, or carboxylic group. Typically, enhanced oxidation conditions (e.g., increased oxidation reaction time and/or amount of N-oxoammonium salt) may lead to conversion of the position 2 and/or 4 carbons to a carboxylic group. Weaker oxidation conditions may lead to conversion of the position 2 and/or 4 carbons to an aldehyde group or ketone group, which are both less oxidized than a carboxylic group.

Oxidation of a carbon at position 2 or 4 of a monomeric ring unit of poly alpha-1,3-glucan to an aldehyde group or carboxylic acid group would open the monomeric ring (i.e., the monomeric unit is no longer cyclic). Such ring opening would be attributable to breaking a carbon-carbon bond. Specifically, it is believed that oxidation of carbon 2 to an aldehyde or carboxylic group breaks the bond between carbons 1 and 2, or the bond between carbons 2 and 3, of a monomeric unit of poly alpha-1,3-glucan. It is believed that oxidation of carbon 4 to an aldehyde or carboxylic group breaks the bond between carbons 3 and 4, or the bond between carbons 4 and 5, of a monomeric unit of poly alpha-1,3-glucan. Thus, oxidation of carbons at positions 2 and/or 4 of poly alpha-1,3-glucan to aldehyde and/or carboxylic groups may produce an oxidized poly alpha-1,3-glucan product in which all or at least about 50%, 60%, 70%, 80%, or 90% (or any integer between 50% and 100%) of the constituent monomeric ring units of the poly alpha-1,3-glucan have been opened. In general, opening of a certain percentage of monomeric ring units only at carbon 2 or at carbon 4 (not both positions) would produce an oxidized product with a molecular weight that is greater than the molecular weight of a product in which the same percentage of monomeric ring units are opened at both carbon positions 2 and 4.

An oxidized poly alpha-1,3-glucan compound is produced herein, for example, by contacting poly alpha-1,3-glucan with at least one N-oxoammonium salt. In certain embodiments, the N-oxoammonium salt comprises a TEMPO oxoammonium salt. Examples of such an N-oxoammonium salt include TEMPO oxoammonium salt itself (structure II) and 4-acetamido-TEMPO oxoammonium salt (structure III). Structure II is comprised within structure III.

Noting that structures II and III are cyclic, an N-oxoammonium salt herein can be a "cyclic N-oxoammonium salt" (or "cyclic oxoammonium salt"). A cyclic N-oxoammonium salt herein can be represented by the following structure:

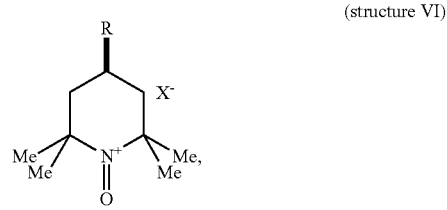

(structure VI)

where each Me represents a methyl group, X⁻ is a counterion, and R is a hydrogen (H), acetamido group (—NH—CO—CH₃), hydroxyl (—OH), amino (—NH₂), carboxyl (—COOH), methoxy (—OCH₃), cyano (—CN), oxo (=O), phosphonooxy [—O—PO(OH)₂], acetoxy (—O—CO—CH₃), benzoyloxy, acetamino, maleimido, or isothiocyanato group. It would be understood that where R in structure VI is an H, the cyclic N-oxoammonium salt is TEMPO oxoammonium salt. Examples of structure VI in which R is a moiety other than an H represent TEMPO oxoammonium salt that is substituted at carbon position 4 (where the N⁺ in structure VI is position 1 in the ring). For example, where R is an acetamido group, the cyclic N-oxoammonium salt of structure VI is 4-acetamido-TEMPO oxoammonium salt. Thus, for example, an N-oxoammonium salt herein can be TEMPO oxoammonium salt having a substitution at carbon position 4 (where the N⁺ in the ring of the TEMPO oxoammonium salt is position 1).

A TEMPO oxoammonium salt can be provided in certain embodiments by oxidizing an agent comprising TEMPO in the aqueous conditions in which the TEMPO oxoammonium salt is contacted with poly alpha-1,3-glucan. An agent comprising TEMPO is an agent/compound comprising structure IV. Examples of an agent comprising TEMPO is TEMPO itself (structure IV) and 4-acetamido-TEMPO (structure V). Other examples of agents comprising TEMPO can be represented by the following structure:

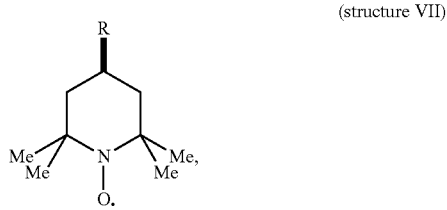

(structure VII)

where each Me represents a methyl group and R is a hydrogen (H), acetamido group (—NH—CO—CH₃), hydroxyl (—OH), amino (—NH₂), carboxyl (—COOH), methoxy (—OCH₃), cyano (—CN), oxo (=O), phosphonooxy [—O—PO(OH)₂], acetoxy (—O—CO—CH₃), benzoyloxy, acetamino, maleimido, or isothiocyanato group. Each of these agents can be converted to its corresponding oxoammonium salt, as represented by structure VI, by contacting it with one or more oxidation agents under aqueous conditions. Thus, structure VI can also be considered as a precursor of an N-oxoammonium salt. TEMPO and its derivatives, such as above (e.g., 4-acetamido-TEMPO), are examples of cyclic nitroxyl compounds. Thus, a cyclic nitroxyl compound can be used to provide a TEMPO oxoammonium salt herein.

An agent comprising TEMPO can be oxidized under aqueous conditions herein to its corresponding oxoammonium salt by contacting the agent with one or more "oxidation agents" (or "oxidant"). This contacting can be performed in the same aqueous conditions in which poly alpha-1,3-glucan is contacted with an N-oxoammonium salt. Typically, a reaction herein for oxidizing poly alpha-1,3-glucan can initially be prepared to comprise, under aqueous conditions, at least poly alpha-1,3-glucan, an agent comprising TEMPO (e.g., structure VII), and one or more oxidation agents. The oxidation agent(s) can convert the agent comprising TEMPO to its corresponding oxoammonium salt (e.g., structure VI), which in turn can oxidize the poly alpha-1,3-glucan.

Non-limiting examples of an oxidation agent include one or more "inorganic oxidation agents" (or "inorganic oxidant"). An inorganic agent herein is not an oxoammonium salt such as a TEMPO oxoammonium salt since such compounds contain organic components (refer to structures I-III, for example). Examples of oxidation agents that may be used to convert an agent comprising TEMPO to its corresponding oxoammonium salt include one or more of a halite (e.g., a chlorite, such as sodium chlorite [$NaClO_2$]) or a hypohalite (e.g., a hypochlorite, such as sodium hypochlorite [NaClO]). Other examples of oxidation agents that may be used to convert an agent comprising TEMPO to its corresponding oxoammonium salt include one or more of a halide salt such as KCl, KBr, NaCl, NaBr, or NaI; a hypohalite such as NaOBr; metals such as Fe(III), Mn(II), Mn(III), or Cu(II); $KMnO_4$; $Mn(OAc)_3$; $Mn_2O_3$; $MnO_2$; $Mn(NO_3)_2$; $MgCl_2$; $Mg(OAc)_2$; $Cu(NO_3)_2$; iodobenzene diacetate [$PhI(OAc)_2$]; $Ca(ClO)_2$; t-BuOCl; $CuCl-O_2$; $NaBrO_2$; $Cl_2$; $Br_2$; and trichloroisocyanuric acid.

Aqueous conditions are used in reactions disclosed herein for oxidizing poly alpha-1,3-glucan. Aqueous conditions herein refer to a solution or mixture in which the solvent is at least about 60 wt % water. Alternatively, aqueous conditions herein are at least about 65, 70, 75, 80, 85, 90, or 95 wt % water (or any integer value between 60 and 95 wt %), for example. Aqueous conditions herein can comprise a buffer, such as an acidic, neutral, or alkaline buffer, at a suitable concentration and selected based on the pH range provided by the buffer. Examples of buffers include citric acid, acetic acid, $KH_2PO_4$, CHES and borate.

Aqueous conditions herein can be acidic, having a pH of 5.5 or less. Alternatively, the pH may be about 2.0, 2.5, 3.0, 3.5, 4.0, 4.5, 5.0, or 5.5. Acidic conditions can be prepared by any means known in the art, such as by adding acetic acid and/or an acetate salt to a solution or mixture. For example, a sodium acetate buffer (acetate buffer) (pH 4-5) (e.g., 0.2-0.3 M solution) can provide acidic conditions.

Poly alpha-1,3-glucan can be included in a reaction herein at about, or at least about, 0.1, 0.25, 0.5, 0.75, 1, 2, 3, 4, 5, 6, 7, 8, 9, or 10 wt % of the reaction, for example. Poly alpha-1,3-glucan can be mixed or dissolved in aqueous conditions before or after an agent comprising TEMPO and/or an oxidation agent (which converts the agent comprising TEMPO to its corresponding oxoammonium salt) is added to the aqueous conditions. The oxidation agent in these particular embodiments can be sodium chlorite and/or sodium hypochlorite, for example.

An agent comprising TEMPO, such as TEMPO and/or 4-acetamido-TEMPO, can be included in a reaction herein at about, or at least about, 0.05, 0.075, 0.1, 0.25, 0.5, 0.75, 1, or 2 wt % of the reaction, for example. In certain embodiments, an agent comprising TEMPO can be added to a reaction in which poly alpha-1,3-glucan has already been mixed or dissolved. Such addition may be made before, after, or at the time an oxidation agent is added to the reaction.

An oxidation agent such as sodium chlorite and/or sodium hypochlorite can be included in a reaction herein at about, or at least about, 0.1, 0.25, 0.5, 0.75, 1, 2, 3, 4, or 5 wt % of the reaction, for example. In certain embodiments, an oxidation agent(s) can be added to a reaction in which poly alpha-1,3-glucan has already been mixed or dissolved.

A reaction in certain embodiments may initially contain poly alpha-1,3-glucan, an agent comprising TEMPO (e.g., 4-acetamido-TEMPO), and one or two oxidation agents (e.g., sodium chlorite and/or sodium hypochlorite) dissolved in a buffer solution (e.g., sodium acetate buffer at a pH of about 4-5). Optionally, no additional components are included in preparing this particular reaction.

Poly alpha-1,3-glucan that is oxidized to produce an oxidized poly alpha-1,3-glucan compound herein may have at least about 50%, 60%, 70%, 80%, 90%, 95%, 96%, 97%, 98%, 99%, or 100% (or any integer between 50% and 100%) glycosidic linkages that are alpha-1,3. In such embodiments, accordingly, the poly alpha-1,3-glucan has less than about 50%, 40%, 30%, 20%, 10%, 5%, 4%, 3%, 2%, 1%, or 0% (or any integer value between 0% and 50%) of glycosidic linkages that are not alpha-1,3. Poly alpha-1,3-glucan in certain preferred embodiments for producing an oxidized poly alpha-1,3-glucan compound has at least 90% alpha-1,3 glycosidic linkages.

Poly alpha-1,3-glucan that is oxidized to produce an oxidized poly alpha-1,3-glucan compound herein preferably has a backbone that is linear/unbranched. In certain embodiments, the poly alpha-1,3-glucan has no branch points or less than about 10%, 9%, 8%, 7%, 6%, 5%, 4%, 3%, 2%, or 1% branch points as a percent of the glycosidic linkages in the polymer. Examples of branch points include alpha-1,6 branch points.

The molecular weight of poly alpha-1,3-glucan that is oxidized to produce an oxidized poly alpha-1,3-glucan compound herein can be measured as number-average molecular weight ($M_n$) or weight-average molecular weight ($M_w$). Alternatively, molecular weight can be measured in Daltons or grams/mole. It may also be useful to refer to the $DP_w$ (weight average degree of polymerization) or $DP_n$ (number average degree of polymerization) of the poly alpha-1,3-glucan polymer.

The $M_n$ or $M_w$ of poly alpha-1,3-glucan that is oxidized to produce an oxidized poly alpha-1,3-glucan compound herein may be at least about 1000. Alternatively, the $M_n$ or $M_w$ can be at least about 1000 to about 600000. Alternatively still, the $M_n$ or $M_w$ can be at least about 10000, 25000, 50000, 75000, 100000, 150000, 200000, 250000, 300000, 350000, 400000, 450000, 500000, 550000, or 600000 (or any integer between 1000 and 600000), for example.

In certain embodiments, a composition comprising an oxidized poly alpha-1,3-glucan compound can be an aqueous composition, with or without a detectable amount of viscosity. It is believed that an aqueous composition comprising oxidized poly alpha-1,3-glucan can, in some aspects, have a viscosity of about, or at least about, 3, 4, 5, 10, 15, 20, 25, 30, 35, 40, 45, or 50 cPs (or any integer between 3 and 50 cPs). Examples of aqueous compositions herein include aqueous mixtures, colloidal dispersions (e.g., hydrocolloid), and aqueous solutions.

Viscosity can be measured with an aqueous composition herein at any temperature between about 3° C. to about 110° C. (or any integer between 3 and 110° C.). Alternatively, viscosity can be measured at a temperature between about 4° C. to 30° C., or about 20° C. to 25° C., for example. Viscosity can be measured at atmospheric pressure (about 760 torr) or any other higher or lower pressure.

The viscosity of an aqueous composition herein can be measured using a viscometer or rheometer, or using any other means known in the art. The viscosity in such embodiments can be measured at a rotational shear rate of about 0.1 to 1000 rpm (revolutions per minute), for example. In other examples, viscosity can be measured at a rotational shear rate of about 10, 60, 150, 250, or 600 rpm.

The pH of an aqueous composition herein can be between about 2.0 to about 12.0, for example. Alternatively, pH can be about 2.0, 3.0, 4.0, 5.0, 6.0, 7.0, 8.0, 9.0, 10.0, 11.0, 12.0; or between 5.0 to about 12.0; or between about 4.0 and 8.0; or between about 5.0 and 8.0, for example.

An aqueous composition herein can comprise a solvent having at least about 10 wt % water. In other embodiments, a solvent is at least about 20, 30, 40, 50, 60, 70, 80, 90, or 100 wt % water (or any integer value between 10 and 100 wt %), for example.

An oxidized poly alpha-1,3-glucan compound herein can be present in an aqueous composition at a wt % of about, or at least about, 0.01, 0.05, 0.1, 0.2, 0.3, 0.4, 0.5, 0.6, 0.7, 0.8, 0.9, 1.0, 1.2, 1.4, 1.6, 1.8, 2.0, 2.5, 3.0, 3.5, 4.0, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %, for example.

An aqueous composition herein can comprise other components in addition to an oxidized poly alpha-1,3-glucan compound. For example, an aqueous composition can comprise one or more salts such as a sodium salt (e.g., NaCl, $Na_2SO_4$). Other non-limiting examples of salts include those having (i) an aluminum, ammonium, barium, calcium, chromium (II or III), copper (I or II), iron (II or III), hydrogen, lead (II), lithium, magnesium, manganese (II or III), mercury (I or II), potassium, silver, sodium strontium, tin (II or IV), or zinc cation, and (ii) an acetate, borate, bromate, bromide, carbonate, chlorate, chloride, chlorite, chromate, cyanamide, cyanide, dichromate, dihydrogen phosphate, ferricyanide, ferrocyanide, fluoride, hydrogen carbonate, hydrogen phosphate, hydrogen sulfate, hydrogen sulfide, hydrogen sulfite, hydride, hydroxide, hypochlorite, iodate, iodide, nitrate, nitride, nitrite, oxalate, oxide, perchlorate, permanganate, peroxide, phosphate, phosphide, phosphite, silicate, stannate, stannite, sulfate, sulfide, sulfite, tartrate, or thiocyanate anion. Thus, any salt having a cation from (i) above and an anion from (ii) above can be in an aqueous composition, for example. A salt can be present in an aqueous composition herein at a wt % of about 0.01 to about 10.00 (or any hundredth increment between 0.01 and 10.00), for example.

A composition comprising an oxidized poly alpha-1,3-glucan compound herein can be non-aqueous (e.g., a dry composition). Examples of such embodiments include powders, granules, microcapsules, flakes, or any other form of particulate matter. Other examples include larger compositions such as pellets, bars, kernels, beads, tablets, sticks, or other agglomerates. A non-aqueous or dry composition herein typically has less than 3, 2, 1, 0.5, or 0.1 wt % water comprised therein. The amount of oxidized poly alpha-1,3-glucan herein in a non-aqueous or dry composition can be about, or at least about, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5, or 99.9 wt %, for example.

An oxidized poly alpha-1,3-glucan compound comprised in certain embodiments as presently disclosed may be crosslinked. Any means known in the art may be used to crosslink one or more oxidized poly alpha-1,3-glucan compounds. Such crosslinks may be borate crosslinks, where the borate is from any boron-containing compound (e.g., boric acid, diborates, tetraborates [e.g., tetraborate decahydrate], pentaborates, polymeric compounds such as Polybor®, polymeric compounds of boric acid, alkali borates), for example. Alternatively, crosslinks can be provided with polyvalent metals such as titanium or zirconium. Titanium crosslinks may be provided, for example, using titanium IV-containing compounds such as titanium ammonium lactate, titanium triethanolamine, titanium acetylacetonate, and polyhydroxy complexes of titanium. Zirconium crosslinks can be provided using zirconium IV-containing compounds such as zirconium lactate, zirconium carbonate, zirconium acetylacetonate, zirconium triethanolamine, zirconium diisopropylamine lactate and polyhydroxy complexes of zirconium, for example. Alternatively still, crosslinks can be provided using glyoxal, for example, such as disclosed in U.S. Patent Appl. Publ. No. 2008/0112907 which is incorporated herein by reference. Glyoxal can be applied under acidic conditions (e.g., slightly acidic conditions such as pH 5-6.5) in some aspects. Alternatively still, crosslinks can be provided with any crosslinking agent described in U.S. Pat. Nos. 4,462,917, 4,464,270, 4,477,360 and 4,799,550, which are all incorporated herein by reference. A crosslinking agent (e.g., borate) may be present in an aqueous composition herein at a concentration of about 0.2% to 20 wt %, or about 0.1, 0.2, 0.3, 0.4, 0.5, 1, 2, 3, 4, 5, 6, 7, 8, 9, 10, 15, or 20 wt %, for example.

It is believed that an oxidized poly alpha-1,3-glucan compound in certain embodiments can have a higher viscosity in an aqueous composition compared to its non-crosslinked counterpart. An aqueous composition (e.g., dispersion or aqueous solution) comprising a crosslinked oxidized poly alpha-1,3-glucan compound herein is believed to have a viscosity of at least about 25 cPs. Alternatively, such an aqueous composition can have a viscosity of at least about 25, 50, 75, 100, 125, 150, 175, 200, 225, 250, 500, 750, or 1000 cPs (or any integer between 25 and 1000 cPs), for example.

An aqueous composition herein comprising a crosslinked oxidized poly alpha-1,3-glucan compound can be in the form of a personal care product, pharmaceutical product, food product, household product, or industrial product, for example. Examples of such products are disclosed below.

Oxidized poly alpha-1,3-glucan compounds disclosed herein may be crosslinked using any means known in the art. Such crosslinkage may be between the same oxidized poly alpha-1,3-glucan compounds, or between two or more different oxidized poly alpha-1,3-glucan compounds. Also, crosslinkage may be intermolecular and/or intramolecular.

A crosslinked oxidized poly alpha-1,3-glucan compound can be prepared as follows, for example. One or more oxidized poly alpha-1,3-glucan compounds can be dissolved in water or an aqueous solution to prepare a 0.2, 0.5, 1, 2, 3, 4, 5, 6, 7, 8, 9, or 10 wt % solution of the compound(s).

Oxidized poly alpha-1,3-glucan compound(s) can be dissolved or mixed using any process known in the art, such as by increasing temperature, manual mixing, and/or homogenization.

A crosslinking agent is next dissolved in the preparation containing oxidized poly alpha-1,3-glucan compound. The concentration of the crosslinking agent in the resulting preparation can be about 0.2 to 20 wt %, or about 0.1, 0.2, 0.3, 0.4, 0.5, 1, 2, 3, 4, 5, 6, 7, 8, 9, 10, 15, or 20 wt %, for example.

The pH of the preparation containing both a crosslinking agent(s) and an oxidized poly alpha-1,3-glucan compound(s) can be adjusted to be alkali (e.g., pH of 8, 8.5, 9, 9.5, or 10). Modification of pH can be done by any means known in the art, such as with a concentrated aqueous solution of an alkali hydroxide such as sodium hydroxide. Dissolving a crosslinking agent in a preparation containing one or more oxidized poly alpha-1,3-glucan compounds at an alkali pH results in crosslinking of the oxidized poly alpha-1,3-glucan compound(s).

A composition herein may optionally contain one or more active enzymes. Non-limiting examples of suitable enzymes include proteases, cellulases, hemicellulases, peroxidases, lipolytic enzymes (e.g., metallolipolytic enzymes), xylanases, lipases, phospholipases, esterases (e.g., arylesterase, polyesterase), perhydrolases, cutinases, pectinases, pectate lyases, mannanases, keratinases, reductases, oxidases (e.g., choline oxidase), phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases and amylases. If an enzyme(s) is included, it may be comprised in a composition herein at about 0.0001-0.1 wt % (e.g., 0.01-0.03 wt %) active enzyme (e.g., calculated as pure enzyme protein), for example.

A cellulase herein can have endocellulase activity (EC 3.2.1.4), exocellulase activity (EC 3.2.1.91), or cellobiase activity (EC 3.2.1.21). A cellulase herein is an "active cellulase" having activity under suitable conditions for maintaining cellulase activity; it is within the skill of the art to determine such suitable conditions. Besides being able to degrade cellulose, a cellulase in certain embodiments can also degrade cellulose ether derivatives such as carboxymethyl cellulose. Examples of cellulose ether derivatives which are expected to not be stable to cellulase are disclosed in U.S. Pat. Nos. 7,012,053, 7,056,880, 6,579,840, 7,534,759 and 7,576,048.

A cellulase herein may be derived from any microbial source, such as a bacteria or fungus. Chemically-modified cellulases or protein-engineered mutant cellulases are included. Suitable cellulases include, but are not limited to, cellulases from the genera Bacillus, Pseudomonas, Streptomyces, Trichoderma, Humicola, Fusarium, Thielavia and Acremonium. As other examples, a cellulase may be derived from Humicola insolens, Myceliophthora thermophila or Fusarium oxysporum; these and other cellulases are disclosed in U.S. Pat. Nos. 4,435,307, 5,648,263, 5,691,178, 5,776,757 and 7,604,974, which are all incorporated herein by reference. Exemplary Trichoderma reesei cellulases are disclosed in U.S. Pat. Nos. 4,689,297, 5,814,501, 5,324,649, and International Patent Appl. Publ. Nos. WO92/06221 and WO92/06165, all of which are incorporated herein by reference. Exemplary Bacillus cellulases are disclosed in U.S. Pat. No. 6,562,612, which is incorporated herein by reference. A cellulase, such as any of the foregoing, preferably is in a mature form lacking an N-terminal signal peptide.

Commercially available cellulases useful herein include CELLUZYME® and CAREZYME® (Novozymes A/S); CLAZINASE® and PURADAX® HA (DuPont Industrial Biosciences), and KAC-500(B)® (Kao Corporation).

Alternatively, a cellulase herein may be produced by any means known in the art, such as described in U.S. Pat. Nos. 4,435,307, 5,776,757 and 7,604,974, which are incorporated herein by reference. For example, a cellulase may be produced recombinantly in a heterologous expression system, such as a microbial or fungal heterologous expression system. Examples of heterologous expression systems include bacterial (e.g., E. coli, Bacillus sp.) and eukaryotic systems. Eukaryotic systems can employ yeast (e.g., Pichia sp., Saccharomyces sp.) or fungal (e.g., Trichoderma sp. such as T. reesei, Aspergillus species such as A. niger) expression systems, for example.

One or more cellulases can be directly added as an ingredient when preparing a composition disclosed herein. Alternatively, one or more cellulases can be indirectly (inadvertently) provided in the disclosed composition. For example, cellulase can be provided in a composition herein by virtue of being present in a non-cellulase enzyme preparation used for preparing a composition. Cellulase in compositions in which cellulase is indirectly provided thereto can be present at about 0.1-10 ppb (e.g., less than 1 ppm), for example. A contemplated benefit of a composition herein, by virtue of employing an oxidized poly alpha-1,3-glucan compound instead of a cellulose-based compound, is that non-cellulase enzyme preparations that might have background cellulase activity can be used without concern that the desired effects of the oxidized poly alpha-1,3-glucan compound will be negated by the background cellulase activity.

A cellulase in certain embodiments can be thermostable. Cellulase thermostability refers to the ability of the enzyme to retain activity after exposure to an elevated temperature (e.g. about 60-70° C.) for a period of time (e.g., about 30-60 minutes). The thermostability of a cellulase can be measured by its half-life ($t\frac{1}{2}$) given in minutes, hours, or days, during which time period half the cellulase activity is lost under defined conditions.

A cellulase in certain embodiments can be stable to a wide range of pH values (e.g. neutral or alkaline pH such as pH of ~7.0 to ~11.0). Such enzymes can remain stable for a predetermined period of time (e.g., at least about 15 min., 30 min., or 1 hour) under such pH conditions.

At least one, two, or more cellulases may be included in a composition herein. The total amount of cellulase in a composition typically is an amount that is suitable for the purpose of using cellulase in the composition (an "effective amount"). For example, an effective amount of cellulase in a composition intended for improving the feel and/or appearance of a cellulose-containing fabric is an amount that produces measurable improvements in the feel of the fabric (e.g., improving fabric smoothness and/or appearance, removing pills and fibrils which tend to reduce fabric appearance sharpness). As another example, an effective amount of cellulase in a fabric stonewashing composition herein is that amount which will provide the desired effect (e.g., to produce a worn and faded look in seams and on fabric panels). The amount of cellulase in a composition herein can also depend on the process parameters in which the composition is employed (e.g., equipment, temperature, time, and the like) and cellulase activity, for example. The effective concentration of cellulase in an aqueous composition in which a fabric is treated can be readily determined by a skilled artisan. In fabric care processes, cellulase can be present in an aqueous composition (e.g., wash liquor) in which a fabric is treated in a concentration that is minimally about 0.01-0.1 ppm total cellulase protein, or about 0.1-10 ppb total cellulase protein (e.g., less than 1 ppm), to maximally about 100, 200, 500, 1000, 2000, 3000, 4000, or 5000 ppm total cellulase protein, for example.

Oxidized poly alpha-1,3-glucan compounds herein are mostly or completely stable (resistant) to being degraded by cellulase. For example, the percent degradation of an oxidized poly alpha-1,3-glucan compound by one or more cellulases is less than 10%, 9%, 8%, 7%, 6%, 5%, 4%, 3%, 2%, or 1%, or is 0%. Such percent degradation can be determined, for example, by comparing the molecular weight of oxidized poly alpha-1,3-glucan before and after treatment with a cellulase for a period of time (e.g., ~24 hours).

Aqueous compositions in certain embodiments are believed to have either shear thinning behavior or shear thickening behavior. Shear thinning behavior is observed as a decrease in viscosity of the aqueous composition as shear rate increases, whereas shear thickening behavior is observed as an increase in viscosity of the aqueous composition as shear rate increases. Modification of the shear thinning behavior or shear thickening behavior of an aqueous composition herein is due to the admixture of an oxidized poly alpha-1,3-glucan compound to the aqueous composition. Thus, one or more oxidized poly alpha-1,3-glucan compounds herein can be added to an aqueous composition to modify its rheological profile (i.e., the flow properties of an aqueous liquid, solution, or mixture are modified) in some aspects. Also, one or more oxidized poly alpha-1,3-glucan compounds can be added to an aqueous composition to modify its viscosity in some aspects.

The rheological properties of aqueous compositions herein can be observed by measuring viscosity over an increasing rotational shear rate (e.g., from about 0.1 rpm to about 1000 rpm). For example, shear thinning behavior of an aqueous composition can be observed as a decrease in viscosity (cPs) by at least about 5%, 10%, 15%, 20%, 25%, 30%, 35%, 40%, 45%, 50%, 55%, 60%, 65%, 70%, 75%, 80%, 85%, 90%, or 95% (or any integer between 5% and 95%) as the rotational shear rate increases from about 10 rpm to 60 rpm, 10 rpm to 150 rpm, 10 rpm to 250 rpm, 60 rpm to 150 rpm, 60 rpm to 250 rpm, or 150 rpm to 250 rpm. As another example, shear thickening behavior of an aqueous composition can be observed as an increase in viscosity (cPs) by at least about 5%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, or 200% (or any integer between 5% and 200%) as the rotational shear rate increases from about 10 rpm to 60 rpm, 10 rpm to 150 rpm, 10 rpm to 250 rpm, 60 rpm to 150 rpm, 60 rpm to 250 rpm, or 150 rpm to 250 rpm.

An aqueous composition disclosed herein can be in the form of, and/or comprised in, a household product, personal care product, industrial product, pharmaceutical product, or food product, for example, such as any of those products described below. Oxidized poly alpha-1,3-glucan compounds herein can optionally be used as builder agents and/or anti-redeposition agents in one or more of these type of products—such use, which depends in part on the application of the product, can be contemplated by a skilled artisan, especially in view of some of the embodiments disclosed herein. In other embodiments, oxidized poly alpha-1,3-glucan compounds herein are believed to have some use as thickening agents in one or more of these products. Such a thickening agent may be used in conjunction with one or more other types of thickening agents if desired, such as those disclosed in U.S. Pat. No. 8,541,041, which is incorporated herein by reference.

Personal care products herein are not particularly limited and include, for example, skin care compositions, cosmetic compositions, antifungal compositions, and antibacterial compositions. Personal care products herein may be in the form of, for example, lotions, creams, pastes, balms, ointments, pomades, gels, liquids, combinations of these and the like. The personal care products disclosed herein can include at least one active ingredient, if desired. An active ingredient is generally recognized as an ingredient that causes an intended pharmacological effect. A personal care product herein can be used in personal care cleaning applications in certain embodiments.

In certain embodiments, a skin care product can be applied to skin for addressing skin damage related to a lack of moisture. A skin care product may also be used to address the visual appearance of skin (e.g., reduce the appearance of flaky, cracked, and/or red skin) and/or the tactile feel of the skin (e.g., reduce roughness and/or dryness of the skin while improved the softness and subtleness of the skin). A skin care product typically may include at least one active ingredient for the treatment or prevention of skin ailments, providing a cosmetic effect, or for providing a moisturizing benefit to skin, such as zinc oxide, petrolatum, white petrolatum, mineral oil, cod liver oil, lanolin, dimethicone, hard fat, vitamin A, allantoin, calamine, kaolin, glycerin, or colloidal oatmeal, and combinations of these. A skin care product may include one or more natural moisturizing factors such as ceramides, hyaluronic acid, glycerin, squalane, amino acids, cholesterol, fatty acids, triglycerides, phospholipids, glycosphingolipids, urea, linoleic acid, glycosaminoglycans, mucopolysaccharide, sodium lactate, or sodium pyrrolidone carboxylate, for example. Other ingredients that may be included in a skin care product include, without limitation, glycerides, apricot kernel oil, canola oil, squalane, squalene, coconut oil, corn oil, jojoba oil, jojoba wax, lecithin, olive oil, safflower oil, sesame oil, shea butter, soybean oil, sweet almond oil, sunflower oil, tea tree oil, shea butter, palm oil, cholesterol, cholesterol esters, wax esters, fatty acids, and orange oil.

A personal care product herein can also be in the form of makeup, lipstick, mascara, rouge, foundation, blush, eyeliner, lip liner, lip gloss, other cosmetics, sunscreen, sun block, nail polish, nail conditioner, bath gel, shower gel, body wash, face wash, lip balm, skin conditioner, cold cream, moisturizer, body spray, soap, body scrub, exfoliant, astringent, scruffing lotion, depilatory, permanent waving solution, antidandruff formulation, antiperspirant composition, deodorant, shaving product, pre-shaving product, after-shaving product, cleanser, skin gel, rinse, dentifrice composition, toothpaste, or mouthwash, for example.

A personal care product in some aspects can be a hair care product. Examples of hair care products herein include shampoo, hair conditioner (leave-in or rinse-out), cream rinse, hair dye, hair coloring product, hair shine product, hair serum, hair anti-frizz product, hair split-end repair product, mousse, hair spray, and styling gel. A hair care product can be in the form of a liquid, paste, gel, solid, or powder in some embodiments. A hair care product as presently disclosed typically comprises one or more of the following ingredients, which are generally used to formulate hair care products: anionic surfactants such as polyoxyethylenelauryl ether sodium sulfate; cationic surfactants such as stearyltrimethylammonium chloride and/or distearyltrimethylammonium chloride; nonionic surfactants such as glyceryl monostearate, sorbitan monopalmitate and/or polyoxyethylenecetyl ether; wetting agents such as propylene glycol, 1,3-butylene glycol, glycerin, sorbitol, pyroglutamic acid salts, amino acids and/or trimethylglycine; hydrocarbons such as liquid paraffins, petrolatum, solid paraffins, squalane and/or olefin oligomers; higher alcohols such as stearyl alcohol and/or cetyl alcohol; superfatting agents; antidandruff agents; disinfectants; anti-inflammatory agents; crude drugs; water-soluble polymers such as methylcellulose, hydroxycellulose and/or partially deacetylated chitin; antiseptics such as paraben; ultra-violet light absorbers; pearling agents; pH adjustors; perfumes; and pigments.

A pharmaceutical product herein can be in the form of an emulsion, liquid, elixir, gel, suspension, solution, cream, or ointment, for example. Also, a pharmaceutical product herein can be in the form of any of the personal care products disclosed herein, such as an antibacterial or antifungal composition. A pharmaceutical product can further comprise one or more pharmaceutically acceptable carriers, diluents, and/or pharmaceutically acceptable salts. An oxidized poly alpha-1,3-glucan compound disclosed herein can also be used in capsules, encapsulants, tablet coatings, and excipients for medicaments and drugs.

Non-limiting examples of food products herein include vegetable, meat, and soy patties; reformed seafood; reformed cheese sticks; cream soups; gravies and sauces; salad dressing; mayonnaise; onion rings; jams, jellies, and syrups; pie filling; potato products such as French fries and extruded fries; batters for fried foods, pancakes/waffles and cakes; pet foods; confectioneries (candy); beverages; frozen desserts; ice cream; cultured dairy products such as cottage cheese, yogurt, cheeses, and sour creams; cake icing and glazes; whipped topping; leavened and unleavened baked goods; bars; and the like.

Oxidized poly alpha-1,3-glucan compounds disclosed herein can typically be used in a food product or any other ingestible material (e.g., enteral pharmaceutical preparation) at a level of about 0.01-10 wt %, 0.01-5 wt %, 0.1-3 wt %, 0.1-4 wt %, 0.1-5 wt %, or 0.1-10 wt %, for example.

A household and/or industrial product herein can be in the form of drywall tape-joint compounds; mortars; grouts; cement plasters; spray plasters; cement stucco; adhesives; pastes; wall/ceiling texturizers; binders and processing aids for tape casting, extrusion forming, injection molding and ceramics; spray adherents and suspending/dispersing aids for pesticides, herbicides, and fertilizers; fabric care products such as fabric softeners and laundry detergents; dishwashing detergents, hard surface cleaners; air fresheners; polymer emulsions; gels such as water-based gels; surfactant solutions; paints such as water-based paints; protective coatings; adhesives; sealants and caulks; inks such as water-based ink; metal-working fluids; or emulsion-based metal cleaning fluids used in electroplating, phosphatizing, galvanizing and/or general metal cleaning operations, for example. A household product or industrial product herein can be used in cleaning applications in certain embodiments, and as such can be comprised in detergent compositions, for example.

Oxidized poly alpha-1,3-glucan compounds disclosed herein are believed to be useful for providing one or more of the following physical properties to a personal care product, pharmaceutical product, household product, industrial product, or food product: thickening, freeze/thaw stability, lubricity, moisture retention and release, texture, consistency, shape retention, emulsification, binding, suspension, dispersion, gelation, reduced mineral hardness, for example. Examples of a concentration or amount of an oxidized poly alpha-1,3-glucan compound in a product can be any of the weight percentages provided above, for example.

A food product herein can be in the form of a confectionery, for example. A confectionary herein can contain one or more sugars (e.g., sucrose, fructose, dextrose) for sweetening, or otherwise be sugar-free.

Examples of confectioneries herein include boiled sugars (hard boiled candies [i.e., hard candy]), dragees, jelly candies, gums, licorice, chews, caramels, toffee, fudge, chewing gums, bubble gums, nougat, chewy pastes, halawa, tablets, lozenges, icing, frosting, pudding, and gels (e.g., fruit gels, gelatin dessert). Other examples of confectioneries include aerated confectioneries such as marshmallows, and baked confectioneries.

A confectionery herein can optionally be prepared with chocolate, in any form (e.g., bars, candies, bonbons, truffles, lentils). A confectionary can be coated with chocolate, sugar-coated, candied, glazed, and/or film-coated, for example. Film-coating processes typically comprise applying to the surface of a confectionery a film-forming liquid composition which becomes, after drying, a protective film. This film-coating serves, for example, to protect the active principles contained in the confectionery; to protect the confectionery itself from moisture, shocks, and/or friability; and/or to confer the confectionery attractive visual properties (e.g., shine, uniform color, smooth surface).

In certain embodiments, a confectionery can be filled with a filling that is liquid, pasty, solid, or powdered. An oxidized poly alpha-1,3-glucan compound herein can be comprised in such a filling, in which case the compound is optionally also included in the confectionery component being filled.

A confectionery herein is optionally sugar-free, comprising no sugar and typically instead having one or more artificial and/or non-sugar sweeteners (optionally non-caloric) (e.g., aspartame, saccharin, STEVIA, SUCRALOSE). A sugar-free confectionery in certain embodiments can comprise one or more polyols (e.g., erythritol, glycerol, lactitol, mannitol, maltitol, xylitol), soluble fibers, and/or proteins in place of sugar.

A food product herein can be in the form of a pet food, for example. A pet food herein can be a food for a domesticated animal such as a dog or cat (or any other companion animal), for example. A pet food in certain embodiments provides to a domestic animal one or more of the following: necessary dietary requirements, treats (e.g., dog biscuits), food supplements. Examples of pet food include dry pet food (e.g., kernels, kibbles), semi-moist compositions, wet pet food (e.g., canned pet food), or any combination thereof. Wet pet food typically has a moisture content over 65%. Semi-moist pet food typically has a moisture content of 20-65% and can include humectants such as propylene glycol, potassium sorbate, and ingredients that prevent microbial growth (bacteria and mold). Dry pet food typically has a moisture content less than 20% and its processing usually includes extruding, drying and/or baking. A pet food can optionally be in the form of a gravy, yogurt, powder, suspension, chew, or treat (e.g., biscuits); all these compositions can also be used as pet food supplements, if desired. Pet treats can be semi-moist chewable treats; dry treats; chewable bones; baked, extruded or stamped treats; or confection treats, for example. Examples of pet food compositions/formulations in which an oxidized poly alpha-1,3-glucan compound herein can be added include those disclosed in U.S. Patent Appl. Publ. Nos. 2013/0280352 and 2010/0159103, and U.S. Pat. No. 6,977,084, which are all incorporated herein by reference.

Compositions disclosed herein can be in the form of a fabric care composition. A fabric care composition herein can be used for hand wash, machine wash and/or other purposes such as soaking and/or pretreatment of fabrics, for example. A fabric care composition may take the form of, for example, a laundry detergent; fabric conditioner; any wash-, rinse-, or dryer-added product; unit dose or spray. Fabric care compositions in a liquid form may be in the form of an aqueous composition as disclosed herein. In other aspects, a fabric care composition can be in a dry form such as a granular detergent or dryer-added fabric softener sheet. Other non-limiting examples of fabric care compositions herein include: granular or powder-form all-purpose or heavy-duty washing agents; liquid, gel or paste-form all-purpose or heavy-duty washing agents; liquid or dry fine-fabric (e.g. delicates) detergents; cleaning auxiliaries such as bleach additives, "stain-stick", or pre-treatments; substrate-laden products such as dry and wetted wipes, pads, or sponges; sprays and mists.

A detergent composition herein may be in any useful form, e.g., as powders, granules, pastes, bars, unit dose, or liquid. A liquid detergent may be aqueous, typically containing up to about 70 wt % of water and 0 wt % to about 30 wt % of organic solvent. It may also be in the form of a compact gel type containing only about 30 wt % water.

A detergent composition herein typically comprises one or more surfactants, wherein the surfactant is selected from nonionic surfactants, anionic surfactants, cationic surfactants, ampholytic surfactants, zwitterionic surfactants, semipolar nonionic surfactants and mixtures thereof. In some embodiments, the surfactant is present at a level of from about 0.1% to about 60%, while in alternative embodiments the level is from about 1% to about 50%, while in still further embodiments the level is from about 5% to about 40%, by weight of the detergent composition. A detergent will usually contain 0 wt % to about 50 wt % of an anionic surfactant such as linear alkylbenzenesulfonate (LAS), alpha-olefinsulfonate (AOS), alkyl sulfate (fatty alcohol sulfate) (AS), alcohol ethoxysulfate (AEOS or AES), secondary alkanesulfonates (SAS), alpha-sulfo fatty acid methyl esters, alkyl- or alkenylsuccinic acid, or soap. In addition, a detergent composition may optionally contain 0 wt % to about 40 wt % of a nonionic surfactant such as alcohol ethoxylate (AEO or AE), carboxylated alcohol ethoxylates, nonylphenol ethoxylate, alkylpolyglycoside, alkyldimethylamineoxide, ethoxylated fatty acid monoethanolamide, fatty acid monoethanolamide, or polyhydroxy alkyl fatty acid amide (as described for example in WO92/06154, which is incorporated herein by reference).

A detergent composition herein typically comprises one or more detergent builders or builder systems. One or more oxidized poly alpha-1,3-glucan compounds can be included as a builder, for example. In some aspects, oxidized poly alpha-1,3-glucan can be included as a co-builder, in which it is used together with one or more additional builders such as any disclosed herein. In some embodiments incorporating at least one builder, the cleaning compositions comprise at least about 1%, from about 3% to about 60%, or even from about 5% to about 40%, builder by weight of the composition. Builders (in addition to oxidized poly alpha-1,3-glucan) include, but are not limited to, alkali metal, ammonium and alkanolammonium salts of polyphosphates, alkali metal silicates, alkaline earth and alkali metal carbonates, aluminosilicates, polycarboxylate compounds, ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, various alkali metal, ammonium and substituted ammonium salts of polyacetic acids such as ethylenediamine tetraacetic acid and nitrilotriacetic acid, as well as polycarboxylates such as mellitic acid, succinic acid, citric acid, oxydisuccinic acid, polymaleic acid, benzene 1,3,5-tricarboxylic acid, carboxymethyloxysuccinic acid, and soluble salts thereof. Indeed, it is contemplated that any suitable builder will find use in various embodiments of the present invention. Additional examples of a detergent builder or complexing agent include zeolite, diphosphate, triphosphate, phosphonate, citrate, nitrilotriacetic acid (NTA), ethylenediaminetetraacetic acid (EDTA), diethylenetriaminepentaacetic acid (DTMPA), alkyl- or alkenylsuccinic acid, soluble silicates or layered silicates (e.g., SKS-6 from Hoechst).

In some embodiments, builders form water-soluble hardness ion complexes (e.g., sequestering builders), such as citrates and polyphosphates (e.g., sodium tripolyphosphate and sodium tripolyphospate hexahydrate, potassium tripolyphosphate, and mixed sodium and potassium tripolyphosphate, etc.). It is contemplated that any suitable builder will find use in the present invention, including those known in the art (See, e.g., EP2100949).

In some embodiments, suitable builders can include phosphate builders and non-phosphate builders. In some embodiments, a builder is a phosphate builder. In some embodiments, a builder is a non-phosphate builder. A builder can be used in a level of from 0.1% to 80%, or from 5% to 60%, or from 10% to 50%, by weight of the composition. In some embodiments, the product comprises a mixture of phosphate and non-phosphate builders. Suitable phosphate builders include mono-phosphates, di-phosphates, tri-polyphosphates or oligomeric-polyphosphates, including the alkali metal salts of these compounds, including the sodium salts. In some embodiments, a builder can be sodium tripolyphosphate (STPP). Additionally, the composition can comprise carbonate and/or citrate, preferably citrate that helps to achieve a neutral pH composition. Other suitable non-phosphate builders include homopolymers and copolymers of polycarboxylic acids and their partially or completely neutralized salts, monomeric polycarboxylic acids and hydroxycarboxylic acids and their salts. In some embodiments, salts of the above mentioned compounds include ammonium and/or alkali metal salts, i.e., lithium, sodium, and potassium salts, including sodium salts. Suitable polycarboxylic acids include acyclic, alicyclic, hetero-cyclic and aromatic carboxylic acids, wherein in some embodiments, they can contain at least two carboxyl groups which are in each case separated from one another by, in some instances, no more than two carbon atoms.

A detergent composition herein can comprise at least one chelating agent. Suitable chelating agents include, but are not limited to, copper, iron and/or manganese chelating agents and mixtures thereof. In embodiments in which at least one chelating agent is used, the composition comprises from about 0.1% to about 15%, or even from about 3.0% to about 10%, chelating agent by weight of the composition.

A detergent composition herein can comprise at least one deposition aid. Suitable deposition aids include, but are not limited to, polyethylene glycol, polypropylene glycol, polycarboxylate, soil release polymers such as polytelephthalic acid, clays such as kaolinite, montmorillonite, atapulgite, illite, bentonite, halloysite, and mixtures thereof.

A detergent composition herein can comprise one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. Additional dye transfer inhibiting agents include manganese phthalocyanine, peroxidases, polyvinylpyrrolidone polymers, polyamine N-oxide polymers, copolymers of N-vinylpyrrolidone and N-vinylim idazole, polyvinyloxazolidones and polyvinylimidazoles and/or mixtures thereof; chelating agents examples of which include ethylene-diamine-tetraacetic acid (EDTA); diethylene triamine penta methylene phosphonic acid (DTPMP); hydroxy-ethane diphosphonic acid (HEDP); ethylenediamine N,N'-disuccinic acid (EDDS); methyl glycine diacetic acid (MGDA); diethylene triamine penta acetic acid (DTPA); propylene diamine tetracetic acid (PDT A); 2-hydroxypyridine-N-oxide (HPNO); or methyl glycine diacetic acid (MGDA); glutamic acid N,N-diacetic acid (N,N-dicarboxymethyl glutamic acid tetrasodium salt (GLDA); nitrilotriacetic acid (NTA); 4,5-dihydroxy-m-benzenedisulfonic acid; citric acid and any salts thereof; N-hydroxyethyl ethylenediaminetriacetic acid (HEDTA), triethylenetetraaminehexaacetic acid (TTNA), N-hydroxyethyliminodiacetic acid (HEIDA), dihydroxyethylglycine (DHEG), ethylenediaminetetrapropionic acid (EDTP) and derivatives thereof, which can be used alone or in combination with any of the above. In embodiments in which at least one dye transfer inhibiting agent is used, a composition herein may comprise from about 0.0001% to about 10%, from about 0.01% to about 5%, or even from about 0.1% to about 3%, by weight of the composition.

A detergent composition herein can comprise silicates. In some of these embodiments, sodium silicates (e.g., sodium disilicate, sodium metasilicate, and/or crystalline phyllosilicates) find use. In some embodiments, silicates are present at a level of from about 1% to about 20% by weight of the composition. In some embodiments, silicates are present at a level of from about 5% to about 15% by weight of the composition.

A detergent composition herein can comprise dispersants. Suitable water-soluble organic materials include, but are not limited to the homo- or co-polymeric acids or their salts, in which the polycarboxylic acid comprises at least two carboxyl radicals separated from each other by not more than two carbon atoms.

A detergent composition herein may additionally comprise one or more enzymes. Examples of enzymes include proteases, cellulases, hemicellulases, peroxidases, lipolytic enzymes (e.g., metallolipolytic enzymes), xylanases, lipases, phospholipases, esterases (e.g., arylesterase, polyesterase), perhydrolases, cutinases, pectinases, pectate lyases, mannanases, keratinases, reductases, oxidases (e.g., choline oxidase, phenoloxidase), phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, alpha-amylases, beta-amylases, galactosidases, galactanases, catalases, carageenases, hyaluronidases, keratinases, lactases, ligninases, peroxidases, phosphatases, polygalacturonases, pullulanases, rhamnogalactouronases, tannases, transglutaminases, xyloglucanases, xylosidases, metalloproteases, arabinofuranosidases, phytases, isomerases, transferases and/or amylases in any combination.

Any cellulase disclosed above is contemplated for use in the disclosed detergent compositions. Suitable cellulases include, but are not limited to *Humicola insolens* cellulases (See e.g., U.S. Pat. No. 4,435,307). Exemplary cellulases contemplated for use herein are those having color care benefit for a textile. Examples of cellulases that provide a color care benefit are disclosed in EP0495257, EP0531372, EP531315, WO96/11262, WO96/29397, WO94/07998; WO98/12307; WO95/24471, WO98/08940, and U.S. Pat. Nos. 5,457,046, 5,686,593 and 5,763,254, all of which are incorporated herein by reference. Examples of commercially available cellulases useful in a detergent include CELLUSOFT®, CELLUCLEAN®, CELLUZYME®, and CAREZYME® (Novo Nordisk A/S and Novozymes A/S); CLAZINASE®, PURADAX HA®, and REVITALENZ™ (DuPont Industrial Biosciences); BIOTOUCH® (AB Enzymes); and KAC-500(B)™ (Kao Corporation). Additional cellulases are disclosed in, e.g., U.S. Pat. No. 7,595,182, U.S. Pat. No. 8,569,033, U.S. Pat. No. 7,138,263, U.S. Pat. No. 3,844,890, U.S. Pat. No. 4,435,307, U.S. Pat. No. 4,435,307, and GB2095275.

In some embodiments, a detergent composition can comprise one or more enzymes (e.g., any disclosed herein), each at a level from about 0.00001% to about 10% by weight of the composition and the balance of cleaning adjunct materials by weight of composition. In some other embodiments, a detergent composition can also comprise each enzyme at a level of about 0.0001% to about 10%, about 0.001% to about 5%, about 0.001% to about 2%, or about 0.005% to about 0.5%, by weight of the composition.

Suitable proteases include those of animal, vegetable or microbial origin. In some embodiments, microbial proteases are used. In some embodiments, chemically or genetically modified mutants are included. In some embodiments, the protease is a serine protease, preferably an alkaline microbial protease or a trypsin-like protease. Examples of alkaline proteases include subtilisins, especially those derived from *Bacillus* (e.g., subtilisin, *lentus, amyloliquefaciens*, subtilisin Carlsberg, subtilisin 309, subtilisin 147 and subtilisin 168). Additional examples include those mutant proteases described in U.S. Pat. Nos. RE34606, 5955340, 5700676, 6312936 and 6482628, all of which are incorporated herein by reference. Additional protease examples include, but are not limited to, trypsin (e.g., of porcine or bovine origin), and the *Fusarium* protease described in WO89/06270. In some embodiments, commercially available protease enzymes include, but are not limited to, MAXATASE®, MAXACAL™, MAXAPEM™, OPTICLEAN®, OPTIMASE®, PROPERASE®, PURAFECT®, PURAFECT® OXP, PURAMAX™, EXCELLASE™, PREFERENZ™ proteases (e.g. P100, P110, P280), EFFECTENZ™ proteases (e.g. P1000, P1050, P2000), EXCELLENZ™ proteases (e.g. P1000), ULTIMASE®, and PURAFAST™ (Genencor); ALCALASE®, SAVINASE®, PRIMASE®, DURAZYM™, POLARZYME®, OVOZYME®, KANNASE®, LIQUANASE®, NEUTRASE®, RELASE® and ESPERASE® (Novozymes); BLAP™ and BLAP™ variants (Henkel Kommanditgesellschaft auf Aktien, Duesseldorf, Germany), and KAP (*B. alkalophilus* subtilisin; Kao Corp., Tokyo, Japan). Various proteases are described in WO95/23221, WO92/21760, WO09/149200, WO09/149144, WO09/149145, WO11/072099, WO10/056640, WO10/056653, WO11/140364, WO12/151534, U.S. Pat. Publ. No. 2008/0090747, and U.S. Pat. Nos. 5,801,039, 5,340,735, 5,500,364, 5,855,625, RE34606, 5955340, 5700676, 6312936, 6482628, 8530219, and various other patents. In some further embodiments, neutral metalloproteases find use in the present invention, including but not limited to, the neutral metalloproteases described in WO1999014341, WO1999033960, WO1999014342, WO1999034003, WO2007044993, WO2009058303 and WO2009058661, all of which are incorporated herein by reference. Exemplary metalloproteases include nprE, the recombinant form of neutral metalloprotease expressed in *Bacillus subtilis* (See e.g., WO07/044993), and PMN, the purified neutral metalloprotease from *Bacillus amyloliquefaciens*.

Suitable mannanases include, but are not limited to, those of bacterial or fungal origin. Chemically or genetically modified mutants are included in some embodiments. Various mannanases are known which find use in the present invention (See, e.g., U.S. Pat. Nos. 6,566,114, 6,602,842, and 6,440,991, all of which are incorporated herein by reference). Commercially available mannanases that find use in the present invention include, but are not limited to MANNASTAR®, PURABRITE™, and MANNAWAY®.

Suitable lipases include those of bacterial or fungal origin. Chemically modified, proteolytically modified, or protein engineered mutants are included. Examples of useful lipases include those from the genera *Humicola* (e.g., *H. lanuginosa*, EP258068 and EP305216; *H. insolens*, WO96/13580), *Pseudomonas* (e.g., *P. alcaligenes* or *P. pseudoalcaligenes*, EP218272; *P. cepacia*, EP331376; *P. stutzeri*, GB1372034; *P. fluorescens* and *Pseudomonas* sp. strain SD 705, WO95/06720 and WO96/27002; *P. wisconsinensis*, WO96/12012); and *Bacillus* (e.g., *B. subtilis*, Dartois et al., Biochemica et Biophysica Acta 1131:253-360; *B. stearothermophilus*, JP64/744992; *B. pumilus*, WO91/16422). Furthermore, a number of cloned lipases find use in some embodiments of the present invention, including but not limited to, *Penicillium camembertii* lipase (See, Yamaguchi et al., Gene 103: 61-67 [1991]), *Geotricum candidum* lipase (See, Schimada et al., J. Biochem., 106:383-388 [1989]), and various *Rhizopus* lipases such as *R. delemar* lipase (See, Hass et al., Gene 109:117-113 [1991]), a *R. niveus* lipase (Kugimiya et al., Biosci. Biotech. Biochem. 56:716-719 [1992]) and *R. oryzae* lipase. Additional lipases useful herein include, for example, those disclosed in WO92/05249, WO94/01541, WO95/35381, WO96/00292, WO95/30744, WO94/25578, WO95/14783, WO95/22615, WO97/04079, WO97/07202, EP407225 and EP260105. Other types of lipase polypeptide enzymes such as cutinases also find use in some embodiments of the present invention, including but not limited to, cutinase derived from *Pseudomonas mendocina* (See, WO88/09367), and cutinase derived from *Fusarium solani pisi* (See, WO90/09446). Examples of certain commercially available lipase enzymes useful herein include M1 LIPASE™, LUMA FAST™, and LIPOMAX™ (Genencor); LIPEX®, LIPOLASE® and LIPOLASE® ULTRA (Novozymes); and LIPASE P™ "Amano" (Amano Pharmaceutical Co. Ltd., Japan).

Suitable polyesterases include, for example, those disclosed in WO01/34899, WO01/14629 and U.S. Pat. No. 6,933,140.

A detergent composition herein can also comprise 2,6-beta-D-fructan hydrolase, which is effective for removal/cleaning of certain biofilms present on household and/or industrial textiles/laundry.

Suitable amylases include, but are not limited to those of bacterial or fungal origin. Chemically or genetically modified mutants are included in some embodiments. Amylases that find use in the present invention, include, but are not limited to, alpha-amylases obtained from *B. licheniformis* (See e.g., GB1296839). Additional suitable amylases include those disclosed in WO9510603, WO9526397, WO9623874, WO9623873, WO9741213, WO9919467, WO0060060, WO0029560, WO9923211, WO9946399, WO0060058, WO0060059, WO9942567, WO0114532, WO02092797, WO0166712, WO0188107, WO0196537, WO0210355, WO9402597, WO0231124, WO9943793, WO9943794, WO2004113551, WO2005001064, WO2005003311, WO0164852, WO2006063594, WO2006066594, WO2006066596, WO2006012899, WO2008092919, WO2008000825, WO2005018336, WO2005066338, WO2009140504, WO2005019443, WO2010091221, WO2010088447, WO0134784, WO2006012902, WO2006031554, WO2006136161, WO2008101894, WO2010059413, WO2011098531, WO2011080352, WO2011080353, WO2011080354, WO2011082425, WO2011082429, WO2011076123, WO2011087836, WO2011076897, WO94183314, WO9535382, WO9909183, WO9826078, WO9902702, WO9743424, WO9929876, WO9100353, WO9605295, WO9630481, WO9710342, WO2008088493, WO2009149419, WO2009061381, WO2009100102, WO2010104675, WO2010117511, and WO2010115021, all of which are incorporated herein by reference.

Suitable amylases include, for example, commercially available amylases such as STAINZYME®, STAINZYME PLUS®, NATALASE®, DURAMYL®, TERMAMYL®, TERMAMYL ULTRA®, FUNGAMYL® and BAN™ (Novo Nordisk A/S and Novozymes A/S); RAP IDASE®, POWERASE®, PURASTAR® and PREFERENZ™ (DuPont Industrial Biosciences).

Suitable peroxidases/oxidases contemplated for use in the compositions include those of plant, bacterial or fungal origin. Chemically modified or protein engineered mutants are included. Examples of peroxidases useful herein include those from the genus *Coprinus* (e.g., *C. cinereus*, WO93/24618, WO95/10602, and WO98/15257), as well as those referenced in WO2005056782, WO2007106293, WO2008063400, WO2008106214, and WO2008106215. Commercially available peroxidases useful herein include, for example, GUARDZYME™ (Novo Nordisk A/S and Novozymes A/S).

In some embodiments, peroxidases are used in combination with hydrogen peroxide or a source thereof (e.g., a percarbonate, perborate or persulfate) in the compositions of the present invention. In some alternative embodiments, oxidases are used in combination with oxygen. Both types of enzymes are used for "solution bleaching" (i.e., to prevent transfer of a textile dye from a dyed fabric to another fabric when the fabrics are washed together in a wash liquor), preferably together with an enhancing agent (See e.g., WO94/12621 and WO95/01426). Suitable peroxidases/oxidases include, but are not limited to, those of plant, bacterial or fungal origin. Chemically or genetically modified mutants are included in some embodiments.

Enzymes that may be comprised in a detergent composition herein may be stabilized using conventional stabilizing agents, e.g., a polyol such as propylene glycol or glycerol; a sugar or sugar alcohol; lactic acid; boric acid or a boric acid derivative (e.g., an aromatic borate ester).

A detergent composition in certain embodiments may comprise one or more polymers. Examples of suitable polymers include carboxymethyl cellulose (CMC), poly (vinylpyrrolidone) (PVP), polyethylene glycol (PEG), poly (vinyl alcohol) (PVA), polycarboxylates such as polyacrylates, maleic/acrylic acid copolymers and lauryl methacrylate/acrylic acid copolymers.

A detergent composition herein may contain a bleaching system. For example, a bleaching system can comprise an $H_2O_2$ source such as perborate or percarbonate, which may be combined with a peracid-forming bleach activator such as tetraacetylethylenediamine (TAED) or nonanoyloxybenzenesulfonate (NOBS). Alternatively, a bleaching system may comprise peroxyacids (e.g., amide, imide, or sulfone type peroxyacids). Alternatively still, a bleaching system can be an enzymatic bleaching system comprising perhydrolase, for example, such as the system described in WO2005/056783.

A detergent composition herein may also contain conventional detergent ingredients such as fabric conditioners, clays, foam boosters, suds suppressors, anti-corrosion agents, soil-suspending agents, anti-soil redeposition agents, dyes, bactericides, tarnish inhibiters, optical brighteners, or perfumes. The pH of a detergent composition herein (measured in aqueous solution at use concentration) is usually neutral or alkaline (e.g., pH of about 7.0 to about 11.0).

It is believed that an oxidized poly alpha-1,3-glucan can be included as an anti-redeposition agent and/or clay soil removal agent in a detergent composition such as a fabric care composition, if desired (such agents can optionally be characterized as whiteness maintenance agents in certain aspects). Examples of other suitable anti-redeposition and/or clay soil removal agents herein include polyethoxy zwitterionic surfactants, water-soluble copolymers of acrylic or methacrylic acid with acrylic or methacrylic acid-ethylene oxide condensates (e.g., U.S. Pat. No. 3,719,647), cellulose derivatives such as carboxymethylcellulose and hydroxypropylcellulose (e.g., U.S. Pat. Nos. 3,597,416 and 3,523,088), and mixtures comprising nonionic alkyl polyethoxy surfactant, polyethoxy alkyl quaternary cationic surfactant and fatty amide surfactant (e.g., U.S. Pat. No. 4,228,044). Non-limiting examples of other suitable anti-redeposition and clay soil removal agents are disclosed in U.S. Pat. Nos. 4,597,898 and 4,891,160, and Int. Pat. Appl. Publ. No. WO95/32272, all of which are incorporated herein by reference.

Particular forms of detergent compositions that can be adapted for purposes disclosed herein are disclosed in, for example, US20090209445A1, US20100081598A1, US700187862, EP150499461, WO2001085888A2, WO2003089562A1, WO2009098659A1, WO2009098660A1, WO2009112992A1, WO2009124160A1, WO2009152031A1, WO2010059483A1, WO2010088112A1, WO2010090915A1, WO2010135238A1, WO2011094687A1, WO2011094690A1, WO2011127102A1, WO2011163428A1, WO2008000567A1, WO2006045391A1, WO2006007911A1, WO2012027404A1, EP174069061, WO2012059336A1, US673064661, WO2008087426A1, WO2010116139A1, and WO2012104613A1, all of which are incorporated herein by reference.

Laundry detergent compositions herein can optionally be heavy duty (all purpose) laundry detergent compositions. Exemplary heavy duty laundry detergent compositions comprise a detersive surfactant (10%-40% wt/wt), including an anionic detersive surfactant (selected from a group of linear or branched or random chain, substituted or unsubstituted alkyl sulphates, alkyl sulphonates, alkyl alkoxylated sulphate, alkyl phosphates, alkyl phosphonates, alkyl carboxylates, and/or mixtures thereof), and optionally non-ionic surfactant (selected from a group of linear or branched or random chain, substituted or unsubstituted alkyl alkoxylated alcohol, e.g., C8-C18 alkyl ethoxylated alcohols and/or C6-C12 alkyl phenol alkoxylates), where the weight ratio of anionic detersive surfactant (with a hydrophilic index (Hlc) of from 6.0 to 9) to non-ionic detersive surfactant is greater than 1:1. Suitable detersive surfactants also include cationic detersive surfactants (selected from a group of alkyl pyridinium compounds, alkyl quaternary ammonium compounds, alkyl quaternary phosphonium compounds, alkyl ternary sulphonium compounds, and/or mixtures thereof); zwitterionic and/or amphoteric detersive surfactants (selected from a group of alkanolamine sulpho-betaines); ampholytic surfactants; semi-polar non-ionic surfactants and mixtures thereof.

A detergent herein such as a heavy duty laundry detergent composition may optionally include, a surfactancy boosting polymer consisting of amphiphilic alkoxylated grease cleaning polymers (selected from a group of alkoxylated polymers having branched hydrophilic and hydrophobic properties, such as alkoxylated polyalkylenimines in the range of 0.05 wt %-10 wt %) and/or random graft polymers (typically comprising of hydrophilic backbone comprising monomers selected from the group consisting of: unsaturated C1-C6 carboxylic acids, ethers, alcohols, aldehydes, ketones, esters, sugar units, alkoxy units, maleic anhydride, saturated polyalcohols such as glycerol, and mixtures thereof; and hydrophobic side chain(s) selected from the group consisting of: C4-C25 alkyl group, polypropylene, polybutylene, vinyl ester of a saturated C1-C6 mono-carboxylic acid, C1-C6 alkyl ester of acrylic or methacrylic acid, and mixtures thereof.

A detergent herein such as a heavy duty laundry detergent composition may optionally include additional polymers such as soil release polymers (include anionically end-capped polyesters, for example SRP1, polymers comprising at least one monomer unit selected from saccharide, dicarboxylic acid, polyol and combinations thereof, in random or block configuration, ethylene terephthalate-based polymers and co-polymers thereof in random or block configuration, for example REPEL-O-TEX SF, SF-2 AND SRP6, TEXCARE SRA100, SRA300, SRN100, SRN170, SRN240, SRN300 AND SRN325, MARLOQUEST SL), anti-redeposition agent(s) herein (0.1 wt % to 10 wt %), include carboxylate polymers, such as polymers comprising at least one monomer selected from acrylic acid, maleic acid (or maleic anhydride), fumaric acid, itaconic acid, aconitic acid, mesaconic acid, citraconic acid, methylenemalonic acid, and any mixture thereof, vinylpyrrolidone homopolymer, and/or polyethylene glycol, molecular weight in the range of from 500 to 100,000 Da); and polymeric carboxylate (such as maleate/acrylate random copolymer or polyacrylate homopolymer).

A detergent herein such as a heavy duty laundry detergent composition may optionally further include saturated or unsaturated fatty acids, preferably saturated or unsaturated C12-C24 fatty acids (0 wt % to 10 wt %); deposition aids disclosed herein (examples for which include polysaccharides, cellulosic polymers, poly diallyl dimethyl ammonium halides (DADMAC), and co-polymers of DAD MAC with vinyl pyrrolidone, acrylam ides, imidazoles, imidazolinium halides, and mixtures thereof, in random or block configuration, cationic guar gum, cationic starch, cationic polyacylam ides, and mixtures thereof).

A detergent herein such as a heavy duty laundry detergent composition may optionally further include dye transfer inhibiting agents, examples of which include manganese phthalocyanine, peroxidases, polyvinylpyrrolidone polymers, polyamine N-oxide polymers, copolymers of N-vinylpyrrolidone and N-vinylimidazole, polyvinyloxazolidones and polyvinylimidazoles and/or mixtures thereof; chelating agents, examples of which include ethylene-di-amine-tetraacetic acid (EDTA), diethylene triamine penta methylene phosphonic acid (DTPMP), hydroxy-ethane diphosphonic acid (HEDP), ethylenediamine N,N'-disuccinic acid (EDDS), methyl glycine diacetic acid (MGDA), diethylene triamine penta acetic acid (DTPA), propylene diamine tetracetic acid (PDTA), 2-hydroxypyridine-N-oxide (HPNO), or methyl glycine diacetic acid (MGDA), glutamic acid N,N-diacetic acid (N,N-dicarboxymethyl glutamic acid tetrasodium salt (GLDA), nitrilotriacetic acid (NTA), 4,5-dihydroxy-m-benzenedisulfonic acid, citric acid and any salts thereof, N-hydroxyethylethylenediaminetriacetic acid (HEDTA), triethylenetetraaminehexaacetic acid (TTNA), N-hydroxyethyliminodiacetic acid (HEIDA), dihydroxyethylglycine (DHEG), ethylenediaminetetrapropionic acid (EDTP), and derivatives thereof.

A detergent herein such as a heavy duty laundry detergent composition may optionally include silicone or fatty-acid based suds suppressors; hueing dyes, calcium and magnesium cations, visual signaling ingredients, anti-foam (0.001 wt % to about 4.0 wt %), and/or a structurant/thickener (0.01 wt % to 5 wt %) selected from the group consisting of diglycerides and triglycerides, ethylene glycol distearate, microcrystalline cellulose, microfiber cellulose, biopolymers, xanthan gum, gellan gum, and mixtures thereof). Such structurant/thickener would be, in certain embodiments, in addition to the one or more oxidized poly alpha-1,3-glucan compounds comprised in the detergent. A structurant can also be referred to as a structural agent.

A detergent herein can be in the form of a heavy duty dry/solid laundry detergent composition, for example. Such a detergent may include: (i) a detersive surfactant, such as any anionic detersive surfactant disclosed herein, any non-ionic detersive surfactant disclosed herein, any cationic detersive surfactant disclosed herein, any zwitterionic and/or amphoteric detersive surfactant disclosed herein, any ampholytic surfactant, any semi-polar non-ionic surfactant, and mixtures thereof; (ii) a builder, such as any phosphate-free builder (e.g., zeolite builders in the range of 0 wt % to less than 10 wt %), any phosphate builder (e.g., sodium tri-polyphosphate in the range of 0 wt % to less than 10 wt %), citric acid, citrate salts and nitrilotriacetic acid, any silicate salt (e.g., sodium or potassium silicate or sodium meta-silicate in the range of 0 wt % to less than 10 wt %); any carbonate salt (e.g., sodium carbonate and/or sodium bicarbonate in the range of 0 wt % to less than 80 wt %), and mixtures thereof; (iii) a bleaching agent, such as any photobleach (e.g., sulfonated zinc phthalocyanines, sulfonated aluminum phthalocyanines, xanthenes dyes, and mixtures thereof), any hydrophobic or hydrophilic bleach activator (e.g., dodecanoyl oxybenzene sulfonate, decanoyl oxybenzene sulfonate, decanoyl oxybenzoic acid or salts thereof, 3,5,5-trimethy hexanoyl oxybenzene sulfonate, tetraacetyl ethylene diamine-TAED, nonanoyloxybenzene sulfonate-NOBS, nitrile quats, and mixtures thereof), any source of hydrogen peroxide (e.g., inorganic perhydrate salts, examples of which include mono or tetra hydrate sodium salt of perborate, percarbonate, persulfate, perphosphate, or persilicate), any preformed hydrophilic and/or hydrophobic peracids (e.g., percarboxylic acids and salts, percarbonic acids and salts, perimidic acids and salts, peroxymonosulfuric acids and salts, and mixtures thereof); and/or (iv) any other components such as a bleach catalyst (e.g., imine bleach boosters examples of which include iminium cations and polyions, iminium zwitterions, modified amines, modified amine oxides, N-sulphonyl imines, N-phosphonyl imines, N-acyl imines, thiadiazole dioxides, perfluoroimines, cyclic sugar ketones, and mixtures thereof), and a metal-containing bleach catalyst (e.g., copper, iron, titanium, ruthenium, tungsten, molybdenum, or manganese cations along with an auxiliary metal cations such as zinc or aluminum and a sequestrate such as EDTA, ethylenediaminetetra(methylenephosphonic acid).

Compositions disclosed herein can be in the form of a dishwashing detergent composition. Examples of dishwashing detergents include automatic dishwashing detergents (typically used in dishwasher machines) and hand-washing dish detergents. A dishwashing detergent composition can be in any dry or liquid/aqueous form as disclosed herein, for example. Components that may be included in certain embodiments of a dishwashing detergent composition include, for example, one or more of a phosphate; oxygen- or chlorine-based bleaching agent; non-ionic surfactant; alkaline salt (e.g., metasilicates, alkali metal hydroxides, sodium carbonate); any active enzyme disclosed herein; anti-corrosion agent (e.g., sodium silicate); anti-foaming agent; additives to slow down the removal of glaze and patterns from ceramics; perfume; anti-caking agent (in granular detergent); starch (in tablet-based detergents); gelling agent (in liquid/gel based detergents); and/or sand (powdered detergents).

Dishwashing detergents such as an automatic dishwasher detergent or liquid dishwashing detergent can comprise (i) a non-ionic surfactant, including any ethoxylated non-ionic surfactant, alcohol alkoxylated surfactant, epoxy-capped poly(oxyalkylated) alcohol, or amine oxide surfactant present in an amount from 0 to 10 wt %; (ii) a builder, in the range of about 5-60 wt %, including oxidized poly alpha-1,3 glucan and any phosphate builder (e.g., mono-phosphates, di-phosphates, tri-polyphosphates, other oligomeric-polyphosphates, sodium tripolyphosphate-STPP), any phosphate-free builder (e.g., amino acid-based compounds including methyl-glycine-diacetic acid [MGDA] and salts or derivatives thereof, glutamic-N,N-diacetic acid [GLDA] and salts or derivatives thereof, iminodisuccinic acid (IDS) and salts or derivatives thereof, carboxy methyl inulin and salts or derivatives thereof, nitrilotriacetic acid [NTA], diethylene triamine penta acetic acid [DTPA], B-alaninediacetic acid [B-ADA] and salts thereof), homopolymers and copolymers of poly-carboxylic acids and partially or completely neutralized salts thereof, monomeric polycarboxylic acids and hydroxycarboxylic acids and salts thereof in the range of 0.5 wt % to 50 wt %, or sulfonated/carboxylated polymers in the range of about 0.1 wt % to about 50 wt %; (iii) a drying aid in the range of about 0.1 wt % to about 10 wt % (e.g., polyesters, especially anionic polyesters, optionally together with further monomers with 3 to 6 functionalities—typically acid, alcohol or ester functionalities which are conducive to polycondensation, polycarbonate-, polyurethane- and/or polyurea-polyorganosiloxane compounds or precursor compounds thereof, particularly of the reactive cyclic carbonate and urea type); (iv) a silicate in the range from about 1 wt % to about 20 wt % (e.g., sodium or potassium silicates such as sodium disilicate, sodium meta-silicate and crystalline phyllosilicates); (v) an inorganic bleach (e.g., perhydrate salts such as perborate, percarbonate, perphosphate, persulfate and persilicate salts) and/or an organic bleach (e.g., organic peroxyacids such as diacyl- and tetraacylperoxides, especially diperoxydodecanedioic acid, diperoxytetradecanedioic acid, and diperoxyhexadecanedioic acid); (vi) a bleach activator (e.g., organic peracid precursors in the range from about 0.1 wt % to about 10 wt %) and/or bleach catalyst (e.g., manganese triazacyclononane and related complexes; Co, Cu, Mn, and Fe bispyridylamine and related complexes; and pentamine acetate cobalt(III) and related complexes); (vii) a metal care agent in the range from about 0.1 wt % to 5 wt % (e.g., benzatriazoles, metal salts and complexes, and/or silicates); and/or (viii) any active enzyme disclosed herein in the range from about 0.01 to 5.0 mg of active enzyme per gram of automatic dishwashing detergent composition, and an enzyme stabilizer component (e.g., oligosaccharides, polysaccharides, and inorganic divalent metal salts).

Various examples of detergent formulations comprising at least one oxidized poly alpha-1,3-glucan compound herein are disclosed below (1-19):

1) A detergent composition formulated as a granulate having a bulk density of at least 600 g/L comprising: linear alkylbenzenesulfonate (calculated as acid) at about 7-12 wt %; alcohol ethoxysulfate (e.g., C12-18 alcohol, 1-2 ethylene oxide [EO]) or alkyl sulfate (e.g., C16-18) at about 1-4 wt %; alcohol ethoxylate (e.g., C14-15 alcohol) at about 5-9 wt %; sodium carbonate at about 14-20 wt %; soluble silicate (e.g., $Na_2O$ $2SiO_2$) at about 2-6 wt %; zeolite (e.g., $NaAlSiO_4$) at about 15-22 wt %; sodium sulfate at about 0-6 wt %; sodium citrate/citric acid at about 0-15 wt %; sodium perborate at about 11-18 wt %; TAED at about 2-6 wt %; an oxidized poly alpha-1,3-glucan compound herein up to about 2 wt %; polymers (e.g., maleic/acrylic acid copolymer, PVP, PEG) at about 0-3 wt %; optionally an enzyme(s) (calculated as pure enzyme protein) at about 0.0001-0.1 wt %; and minor ingredients (e.g., suds suppressors, perfumes, optical brightener, photobleach) at about 0-5 wt %.

2) A detergent composition formulated as a granulate having a bulk density of at least 600 g/L comprising: linear alkylbenzenesulfonate (calculated as acid) at about 6-11 wt %; alcohol ethoxysulfate (e.g., C12-18 alcohol, 1-2 EO) or alkyl sulfate (e.g., C16-18) at about 1-3 wt %; alcohol ethoxylate (e.g., C14-15 alcohol) at about 5-9 wt %; sodium carbonate at about 15-21 wt %; soluble silicate (e.g., $Na_2O$ $2SiO_2$) at about 1-4 wt %; zeolite (e.g., $NaAlSiO_4$) at about 24-34 wt %; sodium sulfate at about 4-10 wt %; sodium citrate/citric acid at about 0-15 wt %; sodium perborate at about 11-18 wt %; TAED at about 2-6 wt %; an oxidized poly alpha-1,3-glucan compound herein up to about 2 wt %; polymers (e.g., maleic/acrylic acid copolymer, PVP, PEG) at about 1-6 wt %; optionally an enzyme(s) (calculated as pure enzyme protein) at about 0.0001-0.1 wt %; and minor ingredients (e.g., suds suppressors, perfumes, optical brightener, photobleach) at about 0-5 wt %.

3) A detergent composition formulated as a granulate having a bulk density of at least 600 g/L comprising: linear alkylbenzenesulfonate (calculated as acid) at about 5-9 wt %; alcohol ethoxysulfate (e.g., C12-18 alcohol, 7 EO) at about 7-14 wt %; soap as fatty acid (e.g., C16-22 fatty acid) at about 1-3 wt %; sodium carbonate at about 10-17 wt %; soluble silicate (e.g., $Na_2O$ $2SiO_2$) at about 3-9 wt %; zeolite (e.g., $NaAlSiO_4$) at about 23-33 wt %; sodium sulfate at about 0-4 wt %; sodium perborate at about 8-16 wt %; TAED at about 2-8 wt %; phosphonate (e.g., EDTMPA) at about 0-1 wt %; an oxidized poly alpha-1,3-glucan compound herein up to about 2 wt %; polymers (e.g., maleic/acrylic acid copolymer, PVP, PEG) at about 0-3 wt %; optionally an enzyme(s) (calculated as pure enzyme protein) at about 0.0001-0.1 wt %; and minor ingredients (e.g., suds suppressors, perfumes, optical brightener) at about 0-5 wt %.

4) A detergent composition formulated as a granulate having a bulk density of at least 600 g/L comprising: linear alkylbenzenesulfonate (calculated as acid) at about 8-12 wt %; alcohol ethoxylate (e.g., C12-18 alcohol, 7 EO) at about 10-25 wt %; sodium carbonate at about 14-22 wt %; soluble silicate (e.g., $Na_2O$ $2SiO_2$) at about 1-5 wt %; zeolite (e.g., $NaAlSiO_4$) at about 25-35 wt %; sodium sulfate at about 0-10 wt %; sodium perborate at about 8-16 wt %; TAED at about 2-8 wt %; phosphonate (e.g., EDTMPA) at about 0-1 wt %; an oxidized poly alpha-1,3-glucan compound herein up to about 2 wt %; polymers (e.g., maleic/acrylic acid copolymer, PVP, PEG) at about 1-3 wt %; optionally an enzyme(s) (calculated as pure enzyme protein) at about 0.0001-0.1 wt %; and minor ingredients (e.g., suds suppressors, perfumes) at about 0-5 wt %.

5) An aqueous liquid detergent composition comprising: linear alkylbenzenesulfonate (calculated as acid) at about 15-21 wt %; alcohol ethoxylate (e.g., C12-18 alcohol, 7 EO; or C12-15 alcohol, 5 EO) at about 12-18 wt %; soap as fatty acid (e.g., oleic acid) at about 3-13 wt %; alkenylsuccinic acid (C12-14) at about 0-13 wt %; aminoethanol at about 8-18 wt %; citric acid at about 2-8 wt %; phosphonate at about 0-3 wt %; an oxidized poly alpha-1,3-glucan compound herein up to about 2 wt %; polymers (e.g., PVP, PEG) at about 0-3 wt %; borate at about 0-2 wt %; ethanol at about 0-3 wt %; propylene glycol at about 8-14 wt %; optionally an enzyme(s) (calculated as pure enzyme protein) at about 0.0001-0.1 wt %; and minor ingredients (e.g., dispersants, suds suppressors, perfume, optical brightener) at about 0-5 wt %.

6) An aqueous structured liquid detergent composition comprising: linear alkylbenzenesulfonate (calculated as acid) at about 15-21 wt %; alcohol ethoxylate (e.g., C12-18 alcohol, 7 EO; or C12-15 alcohol, 5 EO) at about 3-9 wt %; soap as fatty acid (e.g., oleic acid) at about 3-10 wt %; zeolite (e.g., $NaAlSiO_4$) at about 14-22 wt %; potassium citrate about 9-18 wt %; borate at about 0-2 wt %; an oxidized poly alpha-1,3-glucan compound herein up to about 2 wt %; polymers (e.g., PVP, PEG) at about 0-3 wt %; ethanol at about 0-3 wt %; anchoring polymers (e.g., lauryl methacrylate/acrylic acid copolymer, molar ratio 25:1, MW 3800) at about 0-3 wt %; glycerol at about 0-5 wt %; optionally an enzyme(s) (calculated as pure enzyme protein) at about 0.0001-0.1 wt %; and minor ingredients (e.g., dispersants, suds suppressors, perfume, optical brightener) at about 0-5 wt %.

7) A detergent composition formulated as a granulate having a bulk density of at least 600 g/L comprising: fatty alcohol sulfate at about 5-10 wt %, ethoxylated fatty acid monoethanolamide at about 3-9 wt %; soap as fatty acid at about 0-3 wt %; sodium carbonate at about 5-10 wt %; soluble silicate (e.g., $Na_2O$ $2SiO_2$) at about 1-4 wt %; zeolite (e.g., $NaAlSiO_4$) at about 20-40 wt %; sodium sulfate at about 2-8 wt %; sodium perborate at about 12-18 wt %; TAED at about 2-7 wt %; an oxidized poly alpha-1,3-glucan compound herein up to about 2 wt %; polymers (e.g., maleic/acrylic acid copolymer, PEG) at about 1-5 wt %; optionally an enzyme(s) (calculated as pure enzyme protein) at about 0.0001-0.1 wt %; and minor ingredients (e.g., optical brightener, suds suppressors, perfumes) at about 0-5 wt %.

8) A detergent composition formulated as a granulate comprising: linear alkylbenzenesulfonate (calculated as acid) at about 8-14 wt %; ethoxylated fatty acid monoethanolamide at about 5-11 wt %; soap as fatty acid at about 0-3 wt %; sodium carbonate at about 4-10 wt %; soluble silicate (e.g., $Na_2O$ $2SiO_2$) at about 1-4 wt %; zeolite (e.g., $NaAlSiO_4$) at about 30-50 wt %; sodium sulfate at about 3-11 wt %; sodium citrate at about 5-12 wt %; an oxidized poly alpha-1,3-glucan compound herein up to about 2 wt %; polymers (e.g., PVP, maleic/acrylic acid copolymer, PEG) at about 1-5 wt %; optionally an enzyme(s) (calculated as pure enzyme protein) at about 0.0001-0.1 wt %; and minor ingredients (e.g., suds suppressors, perfumes) at about 0-5 wt %.

9) A detergent composition formulated as a granulate comprising: linear alkylbenzenesulfonate (calculated as acid) at about 6-12 wt %; nonionic surfactant at about 1-4 wt %; soap as fatty acid at about 2-6 wt %; sodium carbonate at about 14-22 wt %; zeolite (e.g., NaAlSiO$_4$) at about 18-32 wt %; sodium sulfate at about 5-20 wt %; sodium citrate at about 3-8 wt %; sodium perborate at about 4-9 wt %; bleach activator (e.g., NOBS or TAED) at about 1-5 wt %; an oxidized poly alpha-1,3-glucan compound herein up to about 2 wt %; polymers (e.g., polycarboxylate or PEG) at about 1-5 wt %; optionally an enzyme(s) (calculated as pure enzyme protein) at about 0.0001-0.1 wt %; and minor ingredients (e.g., optical brightener, perfume) at about 0-5 wt %.

10) An aqueous liquid detergent composition comprising: linear alkylbenzenesulfonate (calculated as acid) at about 15-23 wt %; alcohol ethoxysulfate (e.g., C12-15 alcohol, 2-3 EO) at about 8-15 wt %; alcohol ethoxylate (e.g., C12-15 alcohol, 7 EO; or C12-15 alcohol, 5 EO) at about 3-9 wt %; soap as fatty acid (e.g., lauric acid) at about 0-3 wt %; aminoethanol at about 1-5 wt %; sodium citrate at about 5-10 wt %; hydrotrope (e.g., sodium toluenesulfonate) at about 2-6 wt %; borate at about 0-2 wt %; an oxidized poly alpha-1,3-glucan compound herein up to about 1 wt %; ethanol at about 1-3 wt %; propylene glycol at about 2-5 wt %; optionally an enzyme(s) (calculated as pure enzyme protein) at about 0.0001-0.1 wt %; and minor ingredients (e.g., dispersants, perfume, optical brighteners) at about 0-5 wt %.

11) An aqueous liquid detergent composition comprising: linear alkylbenzenesulfonate (calculated as acid) at about 20-32 wt %; alcohol ethoxylate (e.g., C12-15 alcohol, 7 EO; or C12-15 alcohol, 5 EO) at about 6-12 wt %; aminoethanol at about 2-6 wt %; citric acid at about 8-14 wt %; borate at about 1-3 wt %; an oxidized poly alpha-1,3-glucan compound herein up to about 2 wt %; ethanol at about 1-3 wt %; propylene glycol at about 2-5 wt %; other polymers (e.g., maleic/acrylic acid copolymer, anchoring polymer such as lauryl methacrylate/acrylic acid copolymer) at about 0-3 wt %; glycerol at about 3-8 wt %; optionally an enzyme(s) (calculated as pure enzyme protein) at about 0.0001-0.1 wt %; and minor ingredients (e.g., hydrotropes, dispersants, perfume, optical brighteners) at about 0-5 wt %.

12) A detergent composition formulated as a granulate having a bulk density of at least 600 g/L comprising: anionic surfactant (e.g., linear alkylbenzenesulfonate, alkyl sulfate, alpha-olefinsulfonate, alpha-sulfo fatty acid methyl esters, alkanesulfonates, soap) at about 25-40 wt %; nonionic surfactant (e.g., alcohol ethoxylate) at about 1-10 wt %; sodium carbonate at about 8-25 wt %; soluble silicate (e.g., Na$_2$O 2SiO$_2$) at about 5-15 wt %; sodium sulfate at about 0-5 wt %; zeolite (NaAlSiO$_4$) at about 15-28 wt %; sodium perborate at about 0-20 wt %; bleach activator (e.g., TAED or NOBS) at about 0-5 wt %; an oxidized poly alpha-1,3-glucan compound herein up to about 2 wt %; optionally an enzyme(s) (calculated as pure enzyme protein) at about 0.0001-0.1 wt %; and minor ingredients (e.g., perfume, optical brighteners) at about 0-3 wt %.

13) Detergent compositions as described in (1)-(12) above, but in which all or part of the linear alkylbenzenesulfonate is replaced by C12-C18 alkyl sulfate.

14) A detergent composition formulated as a granulate having a bulk density of at least 600 g/L comprising: C12-C18 alkyl sulfate at about 9-15 wt %; alcohol ethoxylate at about 3-6 wt %; polyhydroxy alkyl fatty acid amide at about 1-5 wt %; zeolite (e.g., NaAlSiO$_4$) at about 10-20 wt %; layered disilicate (e.g., SK56 from Hoechst) at about 10-20 wt %; sodium carbonate at about 3-12 wt %; soluble silicate (e.g., Na$_2$O 2SiO$_2$) at 0-6 wt %; sodium citrate at about 4-8 wt %; sodium percarbonate at about 13-22 wt %; TAED at about 3-8 wt %; an oxidized poly alpha-1,3-glucan compound herein up to about 2 wt %; polymers (e.g., polycarboxylates and PVP) at about 0-5 wt %; optionally an enzyme(s) (calculated as pure enzyme protein) at about 0.0001-0.1 wt %; and minor ingredients (e.g., optical brightener, photobleach, perfume, suds suppressors) at about 0-5 wt %.

15) A detergent composition formulated as a granulate having a bulk density of at least 600 g/L comprising: C12-C18 alkyl sulfate at about 4-8 wt %; alcohol ethoxylate at about 11-15 wt %; soap at about 1-4 wt %; zeolite MAP or zeolite A at about 35-45 wt %; sodium carbonate at about 2-8 wt %; soluble silicate (e.g., Na$_2$O 2SiO$_2$) at 0-4 wt %; sodium percarbonate at about 13-22 wt %; TAED at about 1-8 wt %; an oxidized poly alpha-1,3-glucan compound herein up to about 3 wt %; polymers (e.g., polycarboxylates and PVP) at about 0-3 wt %; optionally an enzyme(s) (calculated as pure enzyme protein) at about 0.0001-0.1 wt %; and minor ingredients (e.g., optical brightener, phosphonate, perfume) at about 0-3 wt %.

16) Detergent formulations as described in (1)-(15) above, but that contain a stabilized or encapsulated peracid, either as an additional component or as a substitute for an already specified bleach system(s).

17) Detergent compositions as described in (1), (3), (7), (9) and (12) above, but in which perborate is replaced by percarbonate.

18) Detergent compositions as described in (1), (3), (7), (9), (12), (14) and (15) above, but that additionally contain a manganese catalyst. A manganese catalyst, for example, is one of the compounds described by Hage et al. (1994, *Nature* 369:637-639), which is incorporated herein by reference.

19) Detergent compositions formulated as a non-aqueous detergent liquid comprising a liquid non-ionic surfactant (e.g., a linear alkoxylated primary alcohol), a builder system (e.g., phosphate), an oxidized poly alpha-1,3-glucan compound herein, optionally an enzyme(s), and alkali. The detergent may also comprise an anionic surfactant and/or bleach system.

It is believed that numerous commercially available detergent formulations can be adapted to include an oxidized poly alpha-1,3-glucan compound as disclosed herein. Examples include PUREX® ULTRAPACKS (Henkel), FINISH® QUANTUM (Reckitt Benckiser), CLOROX™ 2 PACKS (Clorox), OXICLEAN MAX FORCE POWER PAKS (Church & Dwight), TIDE® STAIN RELEASE, CASCADE® ACTIONPACS, and TIDE® PODS™ (Procter & Gamble).

Compositions disclosed herein can be in the form of an oral care composition, for example. Examples of oral care compositions include dentifrices, toothpaste, mouth wash, mouth rinse, chewing gum, and edible strips that provide some form of oral care (e.g., treatment or prevention of cavities [dental caries], gingivitis, plaque, tartar, and/or periodontal disease). An oral care composition can also be for treating an "oral surface", which encompasses any soft or hard surface within the oral cavity including surfaces of the tongue, hard and soft palate, buccal mucosa, gums and dental surfaces. A "dental surface" herein is a surface of a natural tooth or a hard surface of artificial dentition including a crown, cap, filling, bridge, denture, or dental implant, for example.

An oral care composition herein can comprise about 0.01-15.0 wt % (e.g., ~0.1-10 wt % or ~0.1-5.0 wt %, ~0.1-2.0 wt %) of one or more oxidized poly alpha-1,3- glucan compounds as disclosed herein, for example. One or more oxidized poly alpha-1,3-glucan compounds comprised in an oral care composition can sometimes be provided therein as a thickening agent and/or dispersion agent, which may be useful to impart a desired consistency and/or mouth feel to the composition. One or more other thickening or dispersion agents can also be provided in an oral care composition herein, such as a carboxyvinyl polymer, carrageenan (e.g., L-carrageenan), natural gum (e.g., karaya, xanthan, gum arabic, tragacanth), colloidal magnesium aluminum silicate, or colloidal silica, for example. In some embodiments, oxidized poly alpha-1,3-glucan can be included as a builder.

An oral care composition herein may be a toothpaste or other dentifrice, for example. Such compositions, as well as any other oral care composition herein, can additionally comprise, without limitation, one or more of an anticaries agent, antimicrobial or antibacterial agent, anticalculus or tartar control agent, surfactant, abrasive, pH-modifying agent, foam modulator, humectant, flavorant, sweetener, pigment/colorant, whitening agent, and/or other suitable components. Examples of oral care compositions to which one or more oxidized poly alpha-1,3-glucan compounds can be added are disclosed in U.S. Patent Appl. Publ. Nos. 2006/0134025, 2002/0022006 and 2008/0057007, which are incorporated herein by reference.

An anticaries agent herein can be an orally acceptable source of fluoride ions. Suitable sources of fluoride ions include fluoride, monofluorophosphate and fluorosilicate salts as well as amine fluorides, including olaflur (N'-octadecyltrimethylendiamine-N,N,N'-tris(2-ethanol)-dihydrofluoride), for example. An anticaries agent can be present in an amount providing a total of about 100-20000 ppm, about 200-5000 ppm, or about 500-2500 ppm, fluoride ions to the composition, for example. In oral care compositions in which sodium fluoride is the sole source of fluoride ions, an amount of about 0.01-5.0 wt %, about 0.05-1.0 wt %, or about 0.1-0.5 wt %, sodium fluoride can be present in the composition, for example.

An antimicrobial or antibacterial agent suitable for use in an oral care composition herein includes, for example, phenolic compounds (e.g., 4-allylcatechol; p-hydroxybenzoic acid esters such as benzylparaben, butylparaben, ethylparaben, methylparaben and propylparaben; 2-benzylphenol; butylated hydroxyanisole; butylated hydroxytoluene; capsaicin; carvacrol; creosol; eugenol; guaiacol; halogenated bisphenolics such as hexachlorophene and bromochlorophene; 4-hexylresorcinol; 8-hydroxyquinoline and salts thereof; salicylic acid esters such as menthyl salicylate, methyl salicylate and phenyl salicylate; phenol; pyrocatechol; salicylanilide; thymol; halogenated diphenylether compounds such as triclosan and triclosan monophosphate), copper (II) compounds (e.g., copper (II) chloride, fluoride, sulfate and hydroxide), zinc ion sources (e.g., zinc acetate, citrate, gluconate, glycinate, oxide, and sulfate), phthalic acid and salts thereof (e.g., magnesium monopotassium phthalate), hexetidine, octenidine, sanguinarine, benzalkonium chloride, domiphen bromide, alkylpyridinium chlorides (e.g. cetylpyridinium chloride, tetradecylpyridinium chloride, N-tetradecyl-4-ethylpyridinium chloride), iodine, sulfonamides, bisbiguanides (e.g., alexidine, chlorhexidine, chlorhexidine digluconate), piperidino derivatives (e.g., delmopinol, octapinol), magnolia extract, grapeseed extract, rosemary extract, menthol, geraniol, citral, eucalyptol, antibiotics (e.g., augmentin, amoxicillin, tetracycline, doxycycline, minocycline, metronidazole, neomycin, kanamycin, clindamycin), and/or any antibacterial agents disclosed in U.S. Pat. No. 5,776,435, which is incorporated herein by reference. One or more antimicrobial agents can optionally be present at about 0.01-10 wt % (e.g., 0.1-3 wt %), for example, in the disclosed oral care composition.

An anticalculus or tartar control agent suitable for use in an oral care composition herein includes, for example, phosphates and polyphosphates (e.g., pyrophosphates), polyaminopropanesulfonic acid (AMPS), zinc citrate trihydrate, polypeptides (e.g., polyaspartic and polyglutamic acids), polyolefin sulfonates, polyolefin phosphates, diphosphonates (e.g., azacycloalkane-2,2-diphosphonates such as azacycloheptane-2,2-diphosphonic acid), N-methyl azacyclopentane-2,3-diphosphonic acid, ethane-1-hydroxy-1,1-diphosphonic acid (EHDP), ethane-1-amino-1,1-diphosphonate, and/or phosphonoalkane carboxylic acids and salts thereof (e.g., their alkali metal and ammonium salts). Useful inorganic phosphate and polyphosphate salts include, for example, monobasic, dibasic and tribasic sodium phosphates, sodium tripolyphosphate, tetrapolyphosphate, mono-, di-, tri- and tetra-sodium pyrophosphates, disodium dihydrogen pyrophosphate, sodium trimetaphosphate, sodium hexametaphosphate, or any of these in which sodium is replaced by potassium or ammonium. Other useful anticalculus agents in certain embodiments include anionic polycarboxylate polymers (e.g., polymers or copolymers of acrylic acid, methacrylic, and maleic anhydride such as polyvinyl methyl ether/maleic anhydride copolymers). Still other useful anticalculus agents include sequestering agents such as hydroxycarboxylic acids (e.g., citric, fumaric, malic, glutaric and oxalic acids and salts thereof) and aminopolycarboxylic acids (e.g., EDTA). One or more anticalculus or tartar control agents can optionally be present at about 0.01-50 wt % (e.g., about 0.05-25 wt % or about 0.1-15 wt %), for example, in the disclosed oral care composition).

A surfactant suitable for use in an oral care composition herein may be anionic, non-ionic, or amphoteric, for example. Suitable anionic surfactants include, without limitation, water-soluble salts of $C_{8-20}$ alkyl sulfates, sulfonated monoglycerides of $C_{8-20}$ fatty acids, sarcosinates, and taurates. Examples of anionic surfactants include sodium lauryl sulfate, sodium coconut monoglyceride sulfonate, sodium lauryl sarcosinate, sodium lauryl isoethionate, sodium laureth carboxylate and sodium dodecyl benzenesulfonate. Suitable non-ionic surfactants include, without limitation, poloxamers, polyoxyethylene sorbitan esters, fatty alcohol ethoxylates, alkylphenol ethoxylates, tertiary amine oxides, tertiary phosphine oxides, and dialkyl sulfoxides. Suitable amphoteric surfactants include, without limitation, derivatives of $C_{8-20}$ aliphatic secondary and tertiary amines having an anionic group such as a carboxylate, sulfate, sulfonate, phosphate or phosphonate. An example of a suitable amphoteric surfactant is cocoamidopropyl betaine. One or more surfactants are optionally present in a total amount of about 0.01-10 wt % (e.g., about 0.05-5.0 wt % or about 0.1-2.0 wt %), for example, in the disclosed oral care composition.

An abrasive suitable for use in an oral care composition herein may include, for example, silica (e.g., silica gel, hydrated silica, precipitated silica), alumina, insoluble phosphates, calcium carbonate, and resinous abrasives (e.g., a urea-formaldehyde condensation product). Examples of insoluble phosphates useful as abrasives herein are orthophosphates, polymetaphosphates and pyrophosphates, and include dicalcium orthophosphate dihydrate, calcium pyrophosphate, beta-calcium pyrophosphate, tricalcium phosphate, calcium polymetaphosphate and insoluble sodium polymetaphosphate. One or more abrasives are optionally present in a total amount of about 5-70 wt % (e.g., about 10-56 wt % or about 15-30 wt %), for example, in the disclosed oral care composition. The average particle size of an abrasive in certain embodiments is about 0.1-30 microns (e.g., about 1-20 microns or about 5-15 microns).

An oral care composition in certain embodiments may comprise at least one pH-modifying agent. Such agents may be selected to acidify, make more basic, or buffer the pH of a composition to a pH range of about 2-10 (e.g., pH ranging from about 2-8, 3-9, 4-8, 5-7, 6-10, or 7-9). Examples of pH-modifying agents useful herein include, without limitation, carboxylic, phosphoric and sulfonic acids; acid salts (e.g., monosodium citrate, disodium citrate, monosodium malate); alkali metal hydroxides (e.g. sodium hydroxide, carbonates such as sodium carbonate, bicarbonates, sesqui-carbonates); borates; silicates; phosphates (e.g., monosodium phosphate, trisodium phosphate, pyrophosphate salts); and imidazole.

A foam modulator suitable for use in an oral care composition herein may be a polyethylene glycol (PEG), for example. High molecular weight PEGs are suitable, including those having an average molecular weight of about 200000-7000000 (e.g., about 500000-5000000 or about 1000000-2500000), for example. One or more PEGs are optionally present in a total amount of about 0.1-10 wt % (e.g. about 0.2-5.0 wt % or about 0.25-2.0 wt %), for example, in the disclosed oral care composition.

An oral care composition in certain embodiments may comprise at least one humectant. A humectant in certain embodiments may be a polyhydric alcohol such as glycerin, sorbitol, xylitol, or a low molecular weight PEG. Most suitable humectants also may function as a sweetener herein. One or more humectants are optionally present in a total amount of about 1.0-70 wt % (e.g., about 1.0-50 wt %, about 2-25 wt %, or about 5-15 wt %), for example, in the disclosed oral care composition.

A natural or artificial sweetener may optionally be comprised in an oral care composition herein. Examples of suitable sweeteners include dextrose, sucrose, maltose, dextrin, invert sugar, mannose, xylose, ribose, fructose, levulose, galactose, corn syrup (e.g., high fructose corn syrup or corn syrup solids), partially hydrolyzed starch, hydrogenated starch hydrolysate, sorbitol, mannitol, xylitol, maltitol, isomalt, aspartame, neotame, saccharin and salts thereof, dipeptide-based intense sweeteners, and cyclamates. One or more sweeteners are optionally present in a total amount of about 0.005-5.0 wt %, for example, in the disclosed oral care composition.

A natural or artificial flavorant may optionally be comprised in an oral care composition herein. Examples of suitable flavorants include vanillin; sage; marjoram; parsley oil; spearmint oil; cinnamon oil; oil of wintergreen (methylsalicylate); peppermint oil; clove oil; bay oil; anise oil; *eucalyptus* oil; citrus oils; fruit oils; essences such as those derived from lemon, orange, lime, grapefruit, apricot, banana, grape, apple, strawberry, cherry, or pineapple; bean- and nut-derived flavors such as coffee, cocoa, cola, peanut, or almond; and adsorbed and encapsulated flavorants. Also encompassed within flavorants herein are ingredients that provide fragrance and/or other sensory effect in the mouth, including cooling or warming effects. Such ingredients include, without limitation, menthol, menthyl acetate, menthyl lactate, camphor, *eucalyptus* oil, eucalyptol, anethole, eugenol, cassia, oxanone, Irisone®, propenyl guaiethol, thymol, linalool, benzaldehyde, cinnamaldehyde, N-ethyl-p-menthan-3-carboxamine, N,2,3-trimethyl-2-isopropylbutanamide, 3-(1-menthoxy)-propane-1,2-diol, cinnamaldehyde glycerol acetal (CGA), and menthone glycerol acetal (MGA). One or more flavorants are optionally present in a total amount of about 0.01-5.0 wt % (e.g., about 0.1-2.5 wt %), for example, in the disclosed oral care composition.

An oral care composition in certain embodiments may comprise at least one bicarbonate salt. Any orally acceptable bicarbonate can be used, including alkali metal bicarbonates such as sodium or potassium bicarbonate, and ammonium bicarbonate, for example. One or more bicarbonate salts are optionally present in a total amount of about 0.1-50 wt % (e.g., about 1-20 wt %), for example, in the disclosed oral care composition.

An oral care composition in certain embodiments may comprise at least one whitening agent and/or colorant. A suitable whitening agent is a peroxide compound such as any of those disclosed in U.S. Pat. No. 8,540,971, which is incorporated herein by reference. Suitable colorants herein include pigments, dyes, lakes and agents imparting a particular luster or reflectivity such as pearling agents, for example. Specific examples of colorants useful herein include talc; mica; magnesium carbonate; calcium carbonate; magnesium silicate; magnesium aluminum silicate; silica; titanium dioxide; zinc oxide; red, yellow, brown and black iron oxides; ferric ammonium ferrocyanide; manganese violet; ultramarine; titaniated mica; and bismuth oxychloride. One or more colorants are optionally present in a total amount of about 0.001-20 wt % (e.g., about 0.01-10 wt % or about 0.1-5.0 wt %), for example, in the disclosed oral care composition.

Additional components that can optionally be included in an oral composition herein include one or more enzymes (above), vitamins, and anti-adhesion agents, for example. Examples of vitamins useful herein include vitamin C, vitamin E, vitamin B5, and folic acid. Examples of suitable anti-adhesion agents include solbrol, ficin, and quorum-sensing inhibitors.

The disclosed invention also concerns a method of preparing an aqueous composition having increased builder and/or anti-redeposition capacity. This method comprises contacting at least one oxidized poly alpha-1,3-glucan compound as disclosed herein with an aqueous composition, wherein the builder and/or anti-redeposition capacity of the aqueous composition is increased by the compound when compared to the builder and/or anti-redeposition capacity of the aqueous composition as it existed before the contacting step. An increase in anti-redeposition capacity can, in some embodiments, also refer to an increase in clay removal capacity.

An aqueous composition in this method can be any aqueous composition as disclosed herein, for example, such as a household care product, personal care product, industrial product, pharmaceutical product, or food product. Examples of suitable household care products include fabric care products such as laundry detergent and fabric softener, and dishwashing detergent. Examples of suitable personal care items include hair care products (e.g. shampoos, conditioners), dentifrice compositions (e.g., toothpaste, mouthwash), and skin care products (e.g., hand or body soap, lotion, cosmetics).

In some embodiments, an aqueous composition in this method is a detergent and/or surfactant composition. Such a composition herein can comprise at least one detergent/surfactant ingredient, such as any of the present disclosure, at about 0.01-10 wt % (e.g., about 0.05-5.0 wt % or about 0.1-2.0 wt %), for example. A skilled artisan would recognize all the various products disclosed herein that constitute examples of detergent/surfactant-comprising compositions such as certain household care products (e.g., laundry detergent, dishwashing detergent) and personal care products (e.g., hand/body soap, dentifrices), particularly those used in cleaning applications.

Contacting an aqueous composition with one or more oxidized poly alpha-1,3-glucan compounds herein can increase the builder and/or anti-redeposition capacity of the aqueous composition. This increase can be an increase of at least about 1%, 5%, 10%, 25%, 50%, 100%, 500%, or 1000% (or any integer between 1% and 1000%), for example, compared to the builder and/or anti-redeposition capacity of the aqueous composition before the contacting step. An increase in builder and/or anti-redeposition capacity can be determined, for example, by comparing the builder and/or anti-redeposition capacity of the aqueous composition obtained by the method (i.e., after the contacting step) with the builder and/or anti-redeposition capacity of the aqueous composition as it had existed before the method (i.e., before the contacting step). Alternatively, a control aqueous composition can be used, which is not contacted with oxidized poly alpha-1,3-glucan, but otherwise contains the same contents as the test composition.

The degree of anti-redeposition and/or clay removal capacity achieved using the presently disclosed subject matter can be measured following the disclosure of U.S. Pat. No. 4,597,898, for example, which is incorporated herein by reference. For example, anti-redeposition comparisons can be conducted in a 5-pot Automatic Miniwasher (AMW) employing 7-grain hardness water and a temperature of 95° F. Test swatches are washed for 10 minutes and rinsed twice with water (7-grain hardness) at 75° F. for 2 minutes. The AMW pots are filled with 6 liters of water each, after which a detergent composition to be tested (control or further containing oxidized poly alpha-1,3-glucan [e.g., 20 ppm]) is added and agitated for 2 minutes. A background soil mixture (200 ppm artificial body soil, 100 ppm vacuum cleaner soil and 200 ppm clay soil) is then added and agitated for an additional 3 minutes. Three 5-inch square test swatches (50% polyester/50% cotton T-shirt material) are then added, along with two 80% cotton/20% polyester terry clothes and two 11-inch square swatches of 100% polyester knit fabric. A 10-minute wash cycle is initiated at this point. Following a rinse cycle, the test swatches are dried in a mini-dryer. Gardner Whiteness meter readings (L, a and b) are then determined for the three test swatches. Anti-redeposition performance (ARD) is then calculated according to the following equation: $ARD = (7(L^2) - 40(L)(b))/700$. The ARD values for the three test swatches are then averaged. The improvement in anti-redeposition performance of the detergent composition containing oxidized poly alpha-1,3-glucan is measured as the difference in ARD value relative to the control composition. As another example of determining degree of anti-redeposition, such can be gauged, in part, following methodology disclosed in the below Examples (adsorption studies).

The degree of increased builder capacity achieved using the presently disclosed subject matter can be measured following any number of methods. For example, increased builder capacity effected by an oxidized poly alpha-1,3-glucan compound can be estimated by determining the extent to which the compound supplies alkalinity to an aqueous composition, or buffers an aqueous composition to maintain alkalinity. As another example, increased builder capacity effected by an oxidized poly alpha-1,3-glucan compound can be estimated by determining the extent to which the compound reduces hardness in an aqueous composition (it is believed that oxidized poly alpha-1,3-glucan can effect this feature by sequestering or chelating hard water cations) and/or helps to remove soil in suspension (this feature typically applies to fabric care compositions). As another example, increased builder capacity can be determined following methodology disclosed in the below Examples (calcium dispersing capacity).

The contacting step in a method for increasing the builder and/or anti-redeposition capacity of an aqueous composition can be performed by mixing or dissolving any oxidized poly alpha-1,3-glucan compound as presently disclosed in the aqueous composition by any means known in the art. For example, mixing or dissolving can be performed manually or with a machine (e.g., industrial mixer or blender, orbital shaker, stir plate, homogenizer, sonicator, bead mill). Mixing or dissolving can comprise a homogenization step in certain embodiments. Homogenization (as well as any other type of mixing) can be performed for about 5 to 60, 5 to 30, 10 to 60, 10 to 30, 5 to 15, or 10 to 15 seconds (or any integer between 5 and 60 seconds), or longer periods of time as necessary to mix oxidized poly alpha-1,3-glucan with the aqueous composition. A homogenizer can be used at about 5000 to 30000 rpm, 10000 to 30000 rpm, 15000 to 30000 rpm, 15000 to 25000 rpm, or 20000 rpm (or any integer between 5000 and 30000 rpm), for example.

After an oxidized poly alpha-1,3-glucan compound herein is mixed with or dissolved into an aqueous composition, the resulting aqueous composition may be filtered, or may not be filtered. For example, an aqueous composition prepared with a homogenization step may or may not be filtered.

The order in which components of an aqueous composition, including oxidized poly alpha-1,3-glucan, are brought together to form the aqueous composition is not believed to be important. For example, oxidized poly-alpha-1,3-glucan can be added as an ingredient at the same time as when one or more other ingredients are added. Thus, the feature of contacting oxidized poly-alpha-1,3-glucan with an aqueous composition is not intended to refer only to embodiments in which an oxidized poly-alpha-1,3-glucan is added to a final- or near final-prepared aqueous composition.

The disclosed invention also concerns a method of treating a material. This method comprises contacting a material with an aqueous composition comprising at least one oxidized poly alpha-1,3-glucan compound as disclosed herein.

A material contacted with an aqueous composition in a contacting method herein can comprise a fabric in certain embodiments. A fabric herein can comprise natural fibers, synthetic fibers, semi-synthetic fibers, or any combination thereof. A semi-synthetic fiber herein is produced using naturally occurring material that has been chemically derivatized, an example of which is rayon. Non-limiting examples of fabric types herein include fabrics made of (i) cellulosic fibers such as cotton (e.g., broadcloth, canvas, chambray, chenille, chintz, corduroy, cretonne, damask, denim, flannel, gingham, jacquard, knit, matelassé, oxford, percale, poplin, plissé, sateen, seersucker, sheers, terry cloth, twill, velvet), rayon (e.g., viscose, modal, lyocell), linen, and Tencel®; (ii) proteinaceous fibers such as silk, wool and related mammalian fibers; (iii) synthetic fibers such as polyester, acrylic, nylon, and the like; (iv) long vegetable fibers from jute, flax, ramie, coir, kapok, sisal, henequen, abaca, hemp and sunn; and (v) any combination of a fabric of (i)-(iv). Fabric comprising a combination of fiber types (e.g., natural and synthetic) include those with both a cotton fiber and polyester, for example. Materials/articles containing one or more fabrics herein include, for example, clothing, curtains, drapes, upholstery, carpeting, bed linens, bath linens, tablecloths, sleeping bags, tents, car interiors, etc. Other materials comprising natural and/or synthetic fibers include, for example, non-woven fabrics, paddings, paper, and foams.

An aqueous composition that is contacted with a fabric can be, for example, a fabric care composition (e.g., laundry detergent, fabric softener). Thus, a treatment method in certain embodiments can be considered a fabric care method or laundry method if employing a fabric care composition therein. A fabric care composition herein is contemplated to effect one or more of the following fabric care benefits (i.e., surface substantive effects): wrinkle removal, wrinkle reduction, wrinkle resistance, fabric wear reduction, fabric wear resistance, fabric pilling reduction, extended fabric life, fabric color maintenance, fabric color fading reduction, reduced dye transfer, fabric color restoration, fabric soiling reduction, fabric soil release, fabric shape retention, fabric smoothness enhancement, anti-redeposition of soil on fabric, anti-greying of laundry, improved fabric hand/handle, and/or fabric shrinkage reduction.

Examples of conditions (e.g., time, temperature, wash/rinse volumes) for conducting a fabric care method or laundry method herein are disclosed in WO1997/003161 and U.S. Pat. Nos. 4,794,661, 4,580,421 and 5,945,394, which are incorporated herein by reference. In other examples, a material comprising fabric can be contacted with an aqueous composition herein: (i) for at least about 5, 10, 20, 30, 40, 50, 60, 70, 80, 90, 100, 110, or 120 minutes; (ii) at a temperature of at least about 10, 15, 20, 25, 30, 35, 40, 45, 50, 55, 60, 65, 70, 75, 80, 85, 90, or 95° C. (e.g., for laundry wash or rinse: a "cold" temperature of about 15-30° C., a "warm" temperature of about 30-50° C., a "hot" temperature of about 50-95° C.); (iii) at a pH of about 2, 3, 4, 5, 6, 7, 8, 9, 10, 11, or 12 (e.g., pH range of about 2-12, or about 3-11); (iv) at a salt (e.g., NaCl) concentration of at least about 0.5, 1.0, 1.5, 2.0, 2.5, 3.0, 3.5, or 4.0 wt %; or any combination of (i)-(iv).

The contacting step in a fabric care method or laundry method can comprise any of washing, soaking, and/or rinsing steps, for example. Contacting a material or fabric in still further embodiments can be performed by any means known in the art, such as dissolving, mixing, shaking, spraying, treating, immersing, flushing, pouring on or in, combining, painting, coating, applying, affixing to, and/or communicating an effective amount of an oxidized poly alpha-1,3-glucan compound herein with the fabric or material. In still further embodiments, contacting may be used to treat a fabric to provide a surface substantive effect. As used herein, the term "fabric hand" or "handle" refers to a person's tactile sensory response towards fabric which may be physical, physiological, psychological, social or any combination thereof. In one embodiment, the fabric hand may be measured using a PhabrOmeter® System for measuring relative hand value (available from Nu Cybertek, Inc. Davis, Calif.) (American Association of Textile Chemists and Colorists (AATCC test method "202-2012, Relative Hand Value of Textiles: Instrumental Method")).

In certain embodiments of treating a material comprising fabric, an oxidized poly alpha-1,3-glucan component(s) of the aqueous composition adsorbs to the fabric. This feature is believed, in part, to render oxidized poly alpha-1,3-glucan compounds herein useful as anti-redeposition agents and/or anti-greying agents in fabric care compositions (in addition to their soil dispersion effect). An anti-redeposition agent or anti-greying agent herein helps keep soil from redepositing onto clothing in wash water after the soil has been removed. It is further contemplated that adsorption of one or more oxidized poly alpha-1,3-glucan compounds herein to a fabric enhances mechanical properties of the fabric.

Adsorption of an oxidized poly alpha-1,3-glucan compound to a fabric herein can be measured using a colorimetric technique (e.g., Dubois et al., 1956, *Anal. Chem.* 28:350-356; Zemljič et al., 2006, *Lenzinger Berichte* 85:68-76; both incorporated herein by reference), for example, or any other method known in the art.

Other materials that can be contacted in the above treatment method include surfaces that can be treated with a dish detergent (e.g., automatic dishwashing detergent or hand dish detergent). Examples of such materials include surfaces of dishes, glasses, pots, pans, baking dishes, utensils and flatware made from ceramic material, china, metal, glass, plastic (e.g., polyethylene, polypropylene, polystyrene, etc.) and wood (collectively referred to herein as "tableware"). Thus, the treatment method in certain embodiments can be considered a dishwashing method or tableware washing method, for example. Examples of conditions (e.g., time, temperature, wash volume) for conducting a dishwashing or tableware washing method herein are disclosed in U.S. Pat. No. 8,575,083, which is incorporated herein by reference. In other examples, a tableware article can be contacted with an aqueous composition herein under a suitable set of conditions such as any of those disclosed above with regard to contacting a fabric-comprising material.

Other materials that can be contacted in the above treatment method include oral surfaces such as any soft or hard surface within the oral cavity including surfaces of the tongue, hard and soft palate, buccal mucosa, gums and dental surfaces (e.g., natural tooth or a hard surface of artificial dentition such as a crown, cap, filling, bridge, denture, or dental implant). Thus, a treatment method in certain embodiments can be considered an oral care method or dental care method, for example. Conditions (e.g., time, temperature) for contacting an oral surface with an aqueous composition herein should be suitable for the intended purpose of making such contact. Other surfaces that can be contacted in a treatment method also include a surface of the integumentary system such as skin, hair or nails.

Thus, certain embodiments of the disclosed invention concern material (e.g., fabric) that comprises an oxidized poly alpha-1,3-glucan compound herein. Such material can be produced following a material treatment method as disclosed herein, for example. A material may comprise an oxidized poly alpha-1,3-glucan compound in certain embodiments if the compound is adsorbed to, or otherwise in contact with, the surface of the material.

Certain embodiments of a method of treating a material herein further comprise a drying step, in which a material is dried after being contacted with the aqueous composition. A drying step can be performed directly after the contacting step, or following one or more additional steps that might follow the contacting step (e.g., drying of a fabric after being rinsed, in water for example, following a wash in an aqueous composition herein). Drying can be performed by any of several means known in the art, such as air drying (e.g., ~20-25° C.), or at a temperature of at least about 30, 40, 50, 60, 70, 80, 90, 100, 120, 140, 160, 170, 175, 180, or 200° C., for example. A material that has been dried herein typically has less than 3, 2, 1, 0.5, or 0.1 wt % water comprised therein. Fabric is a preferred material for conducting an optional drying step.

An aqueous composition used in a treatment method herein can be any aqueous composition disclosed herein. Thus, the oxidized poly alpha-1,3-glucan component(s) of an aqueous composition can be any as disclosed herein.

Examples of aqueous compositions include detergents (e.g., laundry detergent or dish detergent) and water-containing dentifrices such as toothpaste.

The disclosed invention also concerns a method for producing an oxidized poly alpha-1,3-glucan compound. This method comprises: contacting poly alpha-1,3-glucan under aqueous conditions with at least one N-oxoammonium salt, wherein the poly alpha-1,3-glucan is oxidized by the N-oxoammonium salt thereby producing an oxidized poly alpha-1,3-glucan compound. The oxidized poly alpha-1,3-glucan compound produced by this method can optionally be isolated.

An N-oxoammonium salt in certain embodiments of the method can comprise a TEMPO oxoammonium salt. Examples of such an N-oxoammonium salt include TEMPO oxoammonium salt itself (structure II) and 4-acetamido-TEMPO oxoammonium salt (structure III). An N-oxoammonium salt herein can be a cyclic N-oxoammonium salt, for example. A cyclic N-oxoammonium salt is represented by structure VI (above) in certain embodiments. An N-oxoammonium salt in the disclosed method can be a TEMPO oxoammonium salt having a substitution at carbon position 4 (where the $N^+$ in the ring of the TEMPO oxoammonium salt is position 1).

A TEMPO oxoammonium salt can be provided in the disclosed method, for example, by oxidizing an agent comprising TEMPO under aqueous conditions in which a TEMPO oxoammonium salt is contacted with poly alpha-1,3-glucan. An agent comprising TEMPO is an agent/compound comprising structure IV. Examples of an agent comprising TEMPO is TEMPO itself (structure IV) and 4-acetamido-TEMPO (structure V). Other examples of agents comprising TEMPO can be represented by structure VII (above). Each of these agents can be converted to its corresponding oxoammonium salt, as represented by structure VI, by contacting it with one or more oxidation agents in aqueous conditions. Given that TEMPO and its derivatives, such as above (e.g., 4-acetamido-TEMPO), are examples of cyclic nitroxyl compounds, a cyclic nitroxyl compound can be used to provide a TEMPO oxoammonium salt herein.

An agent comprising TEMPO can be oxidized under aqueous conditions of the disclosed method to its corresponding oxoammonium salt by contacting the agent with one or more "oxidation agents" (or "oxidant"). This contacting can be performed under the same aqueous conditions in which poly alpha-1,3-glucan is contacted with an N-oxoammonium salt. Typically, a reaction herein for oxidizing poly alpha-1,3-glucan can initially be prepared to comprise, under aqueous conditions, at least poly alpha-1,3-glucan, an agent comprising TEMPO (e.g., structure VII), and one or more oxidation agents. The oxidation agent(s) can convert the agent comprising TEMPO to its corresponding oxoammonium salt (e.g., structure VI), which in turn oxidizes the poly alpha-1,3-glucan.

Non-limiting examples of an oxidation agent for use in the disclosed method include one or more "inorganic oxidation agents" (or "inorganic oxidant"). Examples of oxidation agents that may be used to convert an agent comprising TEMPO to its corresponding oxoammonium salt under aqueous conditions of the method include one or more of a halite (e.g., a chlorite, such as sodium chlorite [$NaClO_2$]) or a hypohalite (e.g., a hypochlorite, such as sodium hypochlorite [$NaClO$]). Other examples of oxidation agents include one or more of a halide salt such as KCl, KBr, NaCl, NaBr, or NaI; a hypohalite such as NaOBr; metals such as Fe(III), Mn(II), Mn(III), or Cu(II); $KMnO_4$; $Mn(OAc)_3$; $Mn_2O_3$; $MnO_2$; $Mn(NO_3)_2$; $MgCl_2$; $Mg(OAc)_2$; $Cu(NO_3)_2$; iodobenzene diacetate [$PhI(OAc)_2$]; $Ca(ClO)_2$; t-BuOCl; $CuCl-O_2$; $NaBrO_2$; $Cl_2$; $Br_2$; and trichloroisocyanuric acid.

Aqueous conditions are used in the disclosed method for oxidizing poly alpha-1,3-glucan. Aqueous conditions in the method refer to a solution or mixture in which the solvent is at least about 60 wt % water, for example. Alternatively, aqueous conditions can be at least about 65, 70, 75, 80, 85, 90, or 95 wt % water (or any integer value between 60 and 95 wt %), for example. Aqueous conditions herein can comprise a buffer, such as an acidic, neutral, or alkaline buffer, at a suitable concentration and selected based on the pH range provided by the buffer. Examples of buffers include citric acid, acetic acid, $KH_2PO_4$, CHES and borate.

The aqueous conditions of the method herein can be acidic (e.g., pH of 5.5 or less). Alternatively, the pH may be about 2.0, 2.5, 3.0, 3.5, 4.0, 4.5, 5.0, or 5.5. Acidic conditions can be prepared by any means known in the art, such as by adding acetic acid and/or an acetate salt to a solution or mixture. For example, a sodium acetate buffer (acetate buffer) (pH 4-5) (e.g., 0.2-0.3 M solution) can provide acidic conditions.

Poly alpha-1,3-glucan can be included under aqueous conditions of the method at about, or at least about, 0.1, 0.25, 0.5, 0.75, 1, 2, 3, 4, 5, 6, 7, 8, 9, or 10 wt %, for example. Poly alpha-1,3-glucan can be mixed or dissolved under aqueous conditions before or after an agent comprising TEMPO and/or an oxidation agent (which converts the agent comprising TEMPO to its corresponding oxoammonium salt) is added to the aqueous conditions. The oxidation agent in these particular embodiments can be sodium chlorite and/or sodium hypochlorite, for example.

An agent comprising TEMPO, such as TEMPO and/or 4-acetamido-TEMPO, can be included under aqueous conditions of the method at about, or at least about, 0.05, 0.075, 0.1, 0.25, 0.5, 0.75, 1, or 2 wt %, for example. In certain embodiments, an agent comprising TEMPO can be added to aqueous conditions in which poly alpha-1,3-glucan has already been mixed or dissolved. Such addition may be made before, after, or at the time an oxidation agent is added to the aqueous conditions.

An oxidation agent such as sodium chlorite and/or sodium hypochlorite can be included in aqueous conditions of the method at about, or at least about, 0.1, 0.25, 0.5, 0.75, 1, 2, 3, 4, or 5 wt %, for example. In certain embodiments, an oxidation agent(s) can be added to aqueous conditions in which poly alpha-1,3-glucan has already been mixed or dissolved.

Aqueous conditions in certain embodiments of the disclosed method may initially contain poly alpha-1,3-glucan, an agent comprising TEMPO (e.g., 4-acetamido-TEMPO), and one or two oxidation agents (e.g., sodium chlorite and/or sodium hypochlorite) dissolved in a buffer solution (e.g., sodium acetate buffer at a pH of about 4-5). Optionally, no additional components are included in preparing these particular aqueous conditions. These particular aqueous conditions can be maintained for about 20-28 hours (e.g., ~24 hours) at a temperature of about 18° C. to about 40° C. (e.g., room temperature or ~35° C.).

Poly alpha-1,3-glucan can be contacted with at least one N-oxoammonium salt under aqueous conditions by mixing, for example. Mixing can be performed by manual mixing, mixing using an overhead mixer, using a magnetic stir bar, or shaking, for example. Such mixing can be performed during and/or after adding each of poly alpha-1,3-glucan, an agent comprising TEMPO, and one or more oxidation agents to the aqueous conditions. As described above, such aqueous conditions allow contact between the agent comprising TEMPO and one or more oxidation agents, thereby converting the agent comprising TEMPO to its corresponding N-oxoammonium salt. This N-oxoammonium salt can then contact and oxidize the poly alpha-1,3-glucan.

The time period for which poly alpha-1,3-glucan is contacted with at least one N-oxoammonium salt under aqueous conditions can be at least about 1, 4, 8, 12, 16, 20, 24, 28, 32, 36, 40, 44, or 48 hours (or any integer value between 1 to 48 hours), for example. A reaction can be maintained for about 20-28 hours (e.g., ~24 hours) in certain embodiments. The period of time for contacting poly alpha-1,3-glucan with at least one N-oxoammonium salt under aqueous conditions can be measured, for example, from the point of time after each of poly alpha-1,3-glucan, an agent comprising TEMPO, and one or more oxidation agents have been dissolved and/or mixed in the aqueous conditions.

The temperature of aqueous conditions of the disclosed method can be about 18° C. to about 40° C. (or any integer value between 18 to 40° C.), for example. Aqueous conditions in certain embodiments of the method can be maintained at a temperature of about 20-25° C. (i.e., room temperature) or about 34-36° C. (e.g., ~35° C.). The temperature of aqueous conditions can be maintained from the time in which each of poly alpha-1,3-glucan, an agent comprising TEMPO, and one or more oxidation agents have been dissolved and/or mixed under the aqueous conditions, until the reaction is completed. Optionally, the initial aqueous conditions to which each reaction component is added may be at the temperature held for the reaction.

Optionally, a reaction herein can be maintained under an inert gas, with or without heating. As used herein, the term "inert gas" refers to a gas which does not undergo chemical reactions under a set of given conditions, such as those disclosed for preparing a reaction herein.

Upon completion of an oxidation reaction in which acidic aqueous conditions are used, the pH of the reaction can optionally be neutralized. Neutralization of an acidic reaction can be performed using one or more bases (e.g., an alkali hydroxide such as sodium hydroxide). The term "neutral pH" as used herein, refers to a pH that is neither substantially acidic or basic (e.g., a pH of about 6-8, or about 6.0, 6.2, 6.4, 6.6, 6.8, 7.0, 7.2, 7.4, 7.6, 7.8, or 8.0).

An oxidized poly alpha-1,3-glucan compound produced in a reaction herein can optionally be isolated. Such a product may first be precipitated from the aqueous conditions of the reaction. Precipitation can be performed by adding an excess amount (e.g., at least 2-3 times the volume of the reaction volume) of an alcohol such as ethanol or isopropanol (e.g., 100% or 95%) to the reaction. A precipitated product can then be isolated using a filtration funnel, centrifuge, press filter, or any other method or equipment known in the art that allows removal of liquids from solids. For example, a vacuum filtration may be used to isolate an oxidized poly alpha-1,3-glucan product. The isolated compound can be dried using any method known in the art, such as vacuum drying, air drying, or freeze drying.

An oxidized poly alpha-1,3-glucan compound produced in a reaction herein can optionally be washed, following precipitation, one or more times with a liquid that does not readily dissolve the compound. For example, oxidized poly alpha-1,3-glucan can be washed with alcohol, acetone, aromatics, or any combination of these, depending on the solubility of the oxidized compound therein (where lack of solubility is desirable for washing). Oxidized poly alpha-1, 3-glucan can be washed one or more times with an aqueous solution containing methanol or ethanol, for example. For example, 70-95 wt % ethanol can be used to wash the product.

Any of the above oxidation reactions can be repeated using an oxidized poly alpha-1,3-glucan compound produced herein as the starting material for further modification.

The structure and molecular weight of an oxidized poly alpha-1,3-glucan product can be determined using various physiochemical analyses known in the art such as NMR spectroscopy and size exclusion chromatography (SEC).

Poly alpha-1,3-glucan used in the disclosed method may have at least about 50%, 60%, 70%, 80%, 90%, 95%, 96%, 97%, 98%, 99%, or 100% (or any integer between 50% and 100%) glycosidic linkages that are alpha-1,3. In such embodiments, accordingly, the poly alpha-1,3-glucan has less than about 50%, 40%, 30%, 20%, 10%, 5%, 4%, 3%, 2%, 1%, or 0% (or any integer value between 0% and 50%) of glycosidic linkages that are not alpha-1,3. Poly alpha-1, 3-glucan in certain preferred embodiments for producing an oxidized poly alpha-1,3-glucan compound has at least 90% alpha-1,3 glycosidic linkages.

Poly alpha-1,3-glucan used in the disclosed method preferably has a backbone that is linear/unbranched. In certain embodiments, the poly alpha-1,3-glucan has no branch points or less than about 10%, 9%, 8%, 7%, 6%, 5%, 4%, 3%, 2%, or 1% branch points as a percent of the glycosidic linkages in the polymer. Examples of branch points include alpha-1,6 branch points.

The $M_n$ or $M_w$ of poly alpha-1,3-glucan used in the disclosed method may be at least about 1000. Alternatively, the $M_n$ or $M_w$ can be at least about 1000 to about 600000. Alternatively still, the $M_n$ or $M_w$ can be at least about 10000, 25000, 50000, 75000, 100000, 150000, 200000, 250000, 300000, 350000, 400000, 450000, 500000, 550000, or 600000 (or any integer between 1000 and 600000), for example.

As disclosed above, poly alpha-1,3-glucan used for preparing oxidized poly alpha-1,3-glucan compounds herein can be enzymatically produced from sucrose using one or more glucosyltransferase (gtf) enzymes. The poly alpha-1, 3-glucan product of this enzymatic reaction can be purified before using it in the disclosed method. Alternatively, a poly alpha-1,3-glucan product of a gtf reaction can be used with little or no processing for preparing oxidized poly alpha-1, 3-glucan compounds.

A poly alpha-1,3-glucan slurry can be used directly in any of the above processes for producing an oxidized poly alpha-1,3-glucan compound disclosed herein. As used herein, a "poly alpha-1,3-glucan slurry" refers to a mixture comprising the components of a gtf enzymatic reaction. A gtf enzymatic reaction can include, in addition to poly alpha-1,3-glucan itself, various components such as sucrose, one or more gtf enzymes, glucose, fructose, leucrose, buffer, FermaSure®, soluble oligosaccharides, oligosaccharide primers, bacterial enzyme extract components, borates, sodium hydroxide, hydrochloric acid, cell lysate, proteins and/or nucleic acids. Minimally, the components of a gtf enzymatic reaction can include, in addition to poly alpha-1,3-glucan itself, sucrose, one or more gtf enzymes, glucose and fructose, for example. In another example, the components of a gtf enzymatic reaction can include, in addition to poly alpha-1,3-glucan itself, sucrose, one or more gtf enzymes, glucose, fructose, leucrose and soluble oligosaccharides (and optionally bacterial enzyme extract components). It should be apparent that poly alpha-1,3-glucan, when in a slurry as disclosed herein, has not been purified or washed. It should also be apparent that a slurry represents a gtf enzymatic reaction that is complete or for which an observable amount of poly alpha-1,3-glucan has been produced, which forms a solid since it is insoluble in the aqueous reaction milieu (has pH of 5-7, for example). A poly alpha-1,3-glucan slurry can be prepared by setting up a gtf reaction as disclosed in U.S. Pat. No. 7,000,000 or U.S. Patent Appl. Publ. Nos. 2013/0244288, 2013/0244287, or 2014/0087431, for example, all of which are incorporated herein by reference.

Alternatively, a wet cake of poly alpha-1,3-glucan can be used directly in any of the above processes for producing an oxidized poly alpha-1,3-glucan compound disclosed herein. A "wet cake of poly alpha-1,3-glucan" as used herein refers to poly alpha-1,3-glucan that has been separated (e.g., filtered) from a slurry and washed with water or an aqueous solution. A wet cake can be washed at least 1, 2, 3, 4, 5, or more times, for example. The poly alpha-1,3-glucan is not dried when preparing a wet cake. A wet cake is termed as "wet" given the retention of water by the washed poly alpha-1,3-glucan.

A wet cake of poly alpha-1,3-glucan can be prepared using any device known in the art for separating solids from liquids, such as a filter or centrifuge. For example, poly alpha-1,3-glucan solids in a slurry can be collected on a Buchner funnel using a mesh screen over filter paper. Filtered wet cake can be resuspended in water (e.g., deionized water) and filtered one or more times to remove soluble components of the slurry such as sucrose, fructose and leucrose. As another example for preparing a wet cake, poly alpha-1,3-glucan solids from a slurry can be collected as a pellet via centrifugation, resuspended in water (e.g., deionized water), and re-pelleted and resuspended one or more additional times.

Poly alpha-1,3-glucan herein can optionally be provided in a pre-treated form prior to being oxidized according to the present disclosure. An example of a pre-treated form is poly alpha-1,3-glucan that has been treated with an oxidizing agent other than those used in embodiments of the instantly disclosed subject matter. Thus, poly alpha-1,3-glucan in certain aspects herein can be provided in a pre-oxidized form. It is contemplated that such pre-oxidized material in certain embodiments would comprise some amount of intact poly alpha-1,3-glucan polymer that was not oxidized. An oxidizing agent for pre-treating poly alpha-1,3-glucan can comprise periodate, such as a metal periodate (e.g., sodium periodate or potassium periodate), for example. A periodate can be a meta-periodate (e.g., $NaIO_4$) in some aspects. Conditions for pre-treating (pre-oxidizing) poly alpha-1,3-glucan, such as with a periodate-comprising agent, can follow conditions as disclosed in U.S. Pat. Nos. 3,086,969, 6,800,753, 5,747,658 and 6,635,755, for example, which are all disclosed herein by reference.

Non-limiting examples of compositions and methods disclosed herein include:

1. A composition comprising an oxidized poly alpha-1,3-glucan compound, wherein the compound is produced by contacting poly alpha-1,3-glucan under aqueous conditions with at least one N-oxoammonium salt.
2. The composition of embodiment 1, wherein the poly alpha-1,3-glucan has at least 90% alpha-1,3 glycosidic linkages, and/or a weight-average molecular weight of at least 1000.
3. The composition of embodiment 1 or 2, wherein the N-oxoammonium salt comprises a TEMPO oxoammonium salt.
4. The composition of embodiment 3, wherein the N-oxoammonium salt comprises a 4-acetamido-TEMPO oxoammonium salt.
5. The composition of embodiment 1, 2, 3, or 4, wherein the composition is a household product, personal care product, industrial product, pharmaceutical product, or food product.
6. The composition of embodiment 5, wherein the composition is a detergent composition, and further wherein the composition is preferably a household product.
7. A method of producing an oxidized poly alpha-1,3-glucan compound, the method comprising:
    (a) contacting poly alpha-1,3-glucan under aqueous conditions with at least one N-oxoammonium salt, wherein the poly alpha-1,3-glucan is oxidized by the N-oxoammonium salt thereby producing an oxidized poly alpha-1,3-glucan compound, and
    (b) optionally, isolating the oxidized poly alpha-1,3-glucan compound.
8. The method of embodiment 7, wherein the poly alpha-1,3-glucan has at least 90% alpha-1,3 glycosidic linkages, and/or a weight-average molecular weight of at least 1000.
9. The method of embodiment 7 or 8, wherein the N-oxoammonium salt comprises a TEMPO oxoammonium salt.
10. The method of embodiment 9, wherein the N-oxoammonium salt comprises a 4-acetamido-TEMPO oxoammonium salt.
11. The method of embodiment 9, wherein the TEMPO oxoammonium salt is provided by oxidizing an agent comprising TEMPO under the aqueous conditions.
12. The method of embodiment 11, wherein the agent comprising TEMPO is 4-acetamido-TEMPO.
13. The method of embodiment 7, 8, 9, 10, 11, or 12, wherein the aqueous conditions are acidic.
14. A method of increasing the builder capacity and/or anti-redeposition capacity of an aqueous composition, wherein the method comprises:
    contacting an oxidized poly alpha-1,3-glucan compound produced according to the method of any one of embodiments 7-13 with an aqueous composition, wherein the builder and/or anti-redeposition capacity of the aqueous composition is increased by the compound compared to the builder and/or anti-redeposition capacity of the aqueous composition before the contacting step.
15. A method of treating a material, the method comprising: contacting a material with an aqueous composition comprising an oxidized poly alpha-1,3-glucan compound produced according to the method of any one of embodiments 7-13.

EXAMPLES

The disclosed invention is further defined in the following Examples. It should be understood that these Examples, while indicating certain preferred aspects of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Preparation of Poly Alpha-1,3-Glucan

Poly alpha-1,3-glucan was prepared using a gtfJ enzyme preparation as described in U.S. Patent Appl. Publ. No. 2013/0244288, which is incorporated herein by reference in its entirety.

Example 1

Preparation of Oxidized Poly Alpha-1,3-Glucan at Elevated Temperature

This Example describes oxidizing poly alpha-1,3-glucan at an elevated temperature.

1 g of poly alpha-1,3-glucan ($M_w$ [weight-average molecular weight]=165,616) was added to 100 mL of sodium acetate buffer (1.64 g of sodium acetate dissolved in 100 mL of 5% acetic acid and adjusted to pH 4.6 using sodium hydroxide) in a 500-mL capacity Erlenmeyer flask fitted with a thermocouple for temperature monitoring, a rubber stopper, and a magnetic stir bar. Sodium chlorite (0.68 g) and 4-acetamido-TEMPO (0.096 g, Sigma-Aldrich, St. Louis, Mo.) were then added to this preparation and mixed until dissolved. Sodium hypochlorite (0.74 g) was next added to the preparation, which was then stirred for 24 hours at 35° C. on a hot plate. The reaction was quenched by adding an excess amount (~5×) of ethanol, thereby precipitating solid oxidized glucan product. The solid thus formed was collected by vacuum filtration, washed with ethanol (95%) four times, and dried under a vacuum at 20-25° C.

Thus, oxidized poly alpha-1,3-glucan derivative was prepared and isolated from a reaction maintained an elevated temperature.

Example 2

Preparation of Oxidized Poly Alpha-1,3-Glucan at Room Temperature

This Example describes oxidizing poly alpha-1,3-glucan at room temperature.

1 g of poly alpha-1,3-glucan ($M_w$=165,616) was added to 100 mL of sodium acetate buffer (1.64 g of sodium acetate dissolved in 100 mL of 5% acetic acid and adjusted to pH 4.6 using sodium hydroxide) in a 500-mL capacity Erlenmeyer flask fitted with a thermocouple for temperature monitoring, a rubber stopper, and a magnetic stir bar. Sodium chlorite (0.68 g) and 4-acetamido-TEMPO (0.096 g) were then added to this preparation and mixed until dissolved. Sodium hypochlorite (0.74 g) was next added to the preparation, which was then stirred for 24 hours at room temperature (20-25° C.). The reaction was quenched by adding an excess amount (~5×) of ethanol, thereby precipitating solid oxidized glucan product. The solid thus formed was collected by vacuum filtration, washed with ethanol (95%) four times, and dried under a vacuum at 20-25° C.

Thus, oxidized poly alpha-1,3-glucan derivative was prepared and isolated from a reaction maintained at room temperature.

Example 3

Oxidized Poly Alpha-1,3-Glucan Has Builder Activity

This Example discloses testing whether oxidized poly alpha-1,3-glucan has builder activity. This activity was determined by measuring the calcium dispersing capacity of oxidized poly alpha-1,3-glucan material in aqueous conditions.

Assays were performed to determine the calcium dispersing capacity of oxidized poly alpha-1,3-glucan samples. Samples 1 and 2 of oxidized poly alpha-1,3-glucan (Table 1) were prepared following Example 2, using starting material (non-oxidized poly alpha-1,3-glucan) of $M_w$=~160000 (sample 1) and $M_w$=~5000 (sample 2). Sample 3 used starting material of $M_w$=~5000, which was then subjected to a treatment with sodium periodate, followed by a TEMPO treatment. For each assay, oxidized polymer product was dissolved into 100 mL of water with stirring using a magnetic stir bar. The exact mass of oxidized poly alpha-1,3-glucan that dissolved was recorded, after which the pH was adjusted to 8 using 4.5% sodium hydroxide. To this solution, 10 g of 2% sodium carbonate was added and the pH was then adjusted to 11 using sodium hydroxide (if needed). The turbidity of the solution was measured using a turbidity meter. A 4.4% calcium acetate solution was titrated into the solution using a glass burette, with samples taken out for turbidity measurements after each addition. When the percent transmittance of the solution decreased, such decrease indicated that the oxidized poly alpha-1,3-glucan polymer was no longer dispersing the calcium carbonate. The amount of calcium acetate added during the assay was used to determine the calcium dispersing capacity of the oxidized poly alpha-1,3-glucan. The calcium dispersing capacity of each sample of oxidized poly alpha-1,3-glucan is listed in Table 1.

TABLE 1

Calcium Dispersing Capacity of Oxidized Poly Alpha-1,3-Glucan

| Sample | Mass (g) Dissolved | Calcium Acetate (mL) | $CCDC^a$ of sample (g calcium carbonate/g polymer) |
|---|---|---|---|
| 1 | 0.0523 | 0.3 | 252.4 |
| 2 | 0.3406 | 0.99 | 127.9 |
| 3 | 0.1885 | 0.85 | 198.4 |

$^a$CCDC, calcium carbonate dispersing capacity.

Each sample of oxidized poly alpha-1,3-glucan exhibited the ability to delay precipitation of calcium carbonate in this assay, thereby indicating that oxidized poly alpha-1,3-glucan has builder activity. Such builder activity is contemplated to be useful in various applications that benefit from the use of a builder, such as in fabric care compositions.

Example 4

Adsorption of Oxidized Poly Alpha-1,3-Glucan on Various Fabrics

This example discloses how one could test the degree of adsorption of oxidized poly alpha-1,3-glucan on different types of fabric.

First, calibration curves are prepared that could be useful for determining the relative level of adsorption of oxidized poly alpha-1,3-glucan onto fabric surfaces.

Solutions of known concentration (ppm) were made using Direct Red 80 and Toluidine Blue 0 dyes. The absorbance of these solutions were measured using a LAMOTTE SMART2 Colorimeter at either 520 or 620 nm. The absorption information was plotted in order that it can be used to determine dye concentration of solutions exposed to fabric samples. The concentration and absorbance of each calibration curve are provided in Tables 2 and 3.

TABLE 2

Direct Red 80 Dye Calibration Curve Data

| Dye Concentration (ppm) | Average Absorbance @520 nm |
|---|---|
| 25 | 0.823333333 |
| 22.5 | 0.796666667 |
| 20 | 0.666666667 |
| 15 | 0.51 |
| 10 | 0.37 |
| 5 | 0.2 |

TABLE 3

Toluidine Blue O Dye Calibration Curve Data

| Dye Concentration (ppm) | Average Absorbance @620 nm |
|---|---|
| 12.5 | 1.41 |
| 10 | 1.226666667 |
| 7 | 0.88 |
| 5 | 0.676666667 |
| 3 | 0.44 |
| 1 | 0.166666667 |

These calibration curves may be useful for determining the relative level of adsorption of oxidized poly alpha-1,3-glucan on fabric surfaces, such as by following the below methodology.

0.07 wt % or 0.25 wt % solutions of an oxidized poly alpha-1,3-glucan compound in deionized water are made. Each solution is divided into several aliquots with different concentrations of compound (Table 4). Other components are added such as acid (dilute hydrochloric acid) or base (sodium hydroxide) to modify pH, or NaCl salt.

TABLE 4

Oxidized Poly Alpha-1,3-Glucan Compound Solutions Useful in Fabric Adsorption Studies

| Amount of NaCl (g) | Amount of Solution (g) | Polymer Concentration (wt %) | Final pH |
|---|---|---|---|
| 0 | 15 | 0.07 | ~7 |
| 0.15 | 14.85 | 0.0693 | ~7 |
| 0.3 | 14.7 | 0.0686 | ~7 |
| 0.45 | 14.55 | 0.0679 | ~7 |
| 0 | 9.7713 | 0.0683 | ~3 |
| 0 | 9.7724 | 0.0684 | ~5 |
| 0 | 10.0311 | 0.0702 | ~9 |
| 0 | 9.9057 | 0.0693 | ~11 |
| 0 | 15 | 0.25 | ~7 |
| 0.15 | 14.85 | 0.2475 | ~7 |
| 0.3 | 14.7 | 0.245 | ~7 |
| 0.45 | 14.55 | 0.2425 | ~7 |
| 0 | 9.8412 | 0.2459 | ~3 |
| 0 | 9.4965 | 0.2362 | ~5 |
| 0 | 9.518 | 0.2319 | ~9 |
| 0 | 9.8811 | 0.247 | ~11 |

Four different fabric types (cretonne, polyester, 65:35 polyester/cretonne, bleached cotton) are cut into 0.17 g pieces. Each piece is placed in a 2-mL well in a 48-well cell culture plate. Each fabric sample is exposed to 1 mL of each of the above solutions (Table 4) (a control solution with no compound is included for each fabric test). The fabric samples are allowed to sit for at least 30 minutes in the compound solutions. The fabric samples are removed from the compound solutions and rinsed in DI water for at least one minute to remove any unbound compound. The fabric samples are then dried at 60° C. for at least 30 minutes until constant dryness is achieved. The fabric samples are weighed after drying and individually placed in 2-mL wells in a clean 48-well cell culture plate. The fabric samples are then exposed to 1 mL of a 250 ppm Direct Red 80 dye solution or a 250 ppm Toluidine Blue dye solution. The samples are left in the dye solution for at least 15 minutes. Each fabric sample is removed from the dye solution, afterwhich the dye solution is diluted 10×.

The absorbance of the diluted solutions is measured compared to a control sample. A relative measure of oxidized poly alpha-1,3-glucan compound adsorbed to the fabric is calculated based on the calibration curve created above for Direct Red 80 and/or Toluidine Blue dye, as appropriate. Specifically, the difference in UV absorbance for the fabric samples exposed to the oxidized compound compared to the controls (fabric not exposed to compound) represents a relative measure of compound adsorbed to the fabric. This difference in UV absorbance could also be expressed as the amount of dye bound to the fabric (over the amount of dye bound to control), which is calculated using the calibration curve (i.e., UV absorbance is converted to ppm dye). A positive value represents the dye amount that is in excess to the dye amount bound to the control fabric, whereas a negative value represents the dye amount that is less than the dye amount bound to the control fabric. A positive value would reflect that the oxidized poly alpha-1,3-glucan compound adsorbed to the fabric surface.

It is believed that this assay would demonstrate that oxidized poly alpha-1,3-glucan can adsorb to various types of fabric under different salt and pH conditions. This adsorption would suggest that oxidized poly alpha-1,3-glucan compounds are useful in detergents for fabric care (e.g., as anti-redeposition agents).

What is claimed is:

1. A material comprising fiber, wherein an oxidized poly alpha-1,3-glucan compound is adsorbed to the material, and wherein the compound is produced by contacting poly alpha-1,3-glucan having at least 90% alpha-1,3 glycosidic linkages under aqueous conditions with at least one agent that is capable of oxidizing the poly alpha-1,3-glucan.

2. The material of claim 1, wherein the poly alpha-1,3-glucan has at least 95% alpha-1,3 glycosidic linkages.

3. The material of claim 1, wherein the poly alpha-1,3-glucan has a weight-average molecular weight of at least 1000.

4. The material of claim 1, wherein the poly alpha-1,3-glucan has a weight-average molecular weight of at least 5000.

5. The material of claim 1, wherein the compound is crosslinked.

6. The material of claim 1, wherein the fiber is a natural fiber.

7. The material of claim 6, wherein the natural fiber comprises cellulosic fiber.

8. The material of claim 7, wherein the cellulosic fiber is cotton.

9. The material of claim 1, wherein the fiber is a synthetic fiber.

10. The material of claim 9, wherein the synthetic fiber comprises polyester.

11. The material of claim 1, wherein the fiber is a semi-synthetic fiber, optionally wherein the semi-synthetic fiber comprises rayon.

12. The material of claim 1, wherein the material comprises a combination of natural fiber and synthetic fiber.

13. The material of claim 12, wherein the material comprises cellulosic fiber and polyester.

14. The material of claim 1, wherein the material is fabric.

15. The material of claim 1, wherein the material is non-woven fabric, padding, or foam.

16. The material of claim 1, wherein the material is paper.

17. The material of claim 1, wherein said agent comprises an N-oxoammonium salt.

18. The material of claim 17, wherein the N-oxoammonium salt comprises a TEMPO oxoammonium salt, optionally wherein the N-oxoammonium salt comprises a 4-acetamido-TEMPO oxoammonium salt.

19. The material of claim 1, wherein said agent comprises a periodate.

20. A method of treating a material comprising fiber, said method comprising:

contacting the material with an aqueous composition comprising an oxidized poly alpha-1,3-glucan compound, whereby the compound adsorbs to the material, wherein said compound is produced by contacting poly alpha-1,3-glucan having at least 90% alpha-1,3 glycosidic linkages under aqueous conditions with at least one agent that is capable of oxidizing the poly alpha-1,3-glucan.

21. The material of claim 1, wherein the poly alpha-1,3-glucan has at least 99% alpha-1,3 glycosidic linkages.

22. A material comprising fiber and an oxidized poly alpha-1,3-glucan compound, wherein the compound is produced by contacting poly alpha-1,3-glucan having at least 90% alpha-1,3 glycosidic linkages under aqueous conditions with at least one agent that is capable of oxidizing the poly alpha-1,3-glucan.

23. The material of claim 22, wherein the poly alpha-1,3-glucan has at least 95% alpha-1,3 glycosidic linkages.

24. The material of claim 22, wherein the poly alpha-1,3-glucan has at least 99% alpha-1,3 glycosidic linkages.

25. The material of claim 22, wherein the fiber is a natural fiber.

26. The material of claim 25, wherein the natural fiber comprises cellulosic fiber.

27. The material of claim 22, wherein the fiber is a synthetic fiber.

28. The material of claim 27, wherein the synthetic fiber comprises polyester.

29. The material of claim 22, wherein the material is fabric.

30. The material of claim 22, wherein the material is paper.

* * * * *